(12) United States Patent
Sagues et al.

(10) Patent No.: US 12,724,008 B2
(45) Date of Patent: Sep. 1, 2026

(54) SYSTEM AND METHOD FOR IMAGING TENDON CROSS SECTIONS FOR DETECTING FILLER FLAWS IN EXTERNAL TENDONS WITH FLEXIBLE FILLERS

(71) Applicant: UNIVERSITY OF SOUTH FLORIDA, Tampa, FL (US)

(72) Inventors: Alberto A Sagues, Tampa, FL (US); Christopher L. Alexander, Tampa, FL (US); Mahesh Karki, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 19/378,137

(22) Filed: Nov. 3, 2025

(65) Prior Publication Data

US 2026/0126414 A1 May 7, 2026

Related U.S. Application Data

(60) Provisional application No. 63/715,359, filed on Nov. 1, 2024.

(51) Int. Cl.
*G01N 27/82* (2006.01)
*G01N 27/02* (2006.01)

(52) U.S. Cl.
CPC ............. *G01N 27/82* (2013.01); *G01N 27/02* (2013.01)

(58) Field of Classification Search
CPC ........ G01N 27/02; G01N 27/20; G01N 27/82; G01N 33/383
See application file for complete search history.

(56) References Cited

U.S. PATENT DOCUMENTS

| | | | | |
|---|---|---|---|---|
| 9,535,026 | B2 | 1/2017 | Marashdeh et al. | |
| 2022/0214294 | A1* | 7/2022 | Sagues | E04C 5/08 |
| 2024/0280538 | A1* | 8/2024 | Choi | B25J 5/02 |

OTHER PUBLICATIONS

Freij, (Development of Tendon Imaging Sensor), University of South Florida, FDOT Contract No. BDV25-977-24 USF Contract No. 2104 1245 00, August (Year: 2019).*

Dukeman, David, “Device for Imaging Cross-Section of Post-Tensioned Structural Tendons in the Field” (2019). USF Tampa Graduate Theses and Dissertations. https://digitalcommons.usf.edu/etd/8634 (Year: 2019).*

Bray, Quality Control of Grouting for Post-Tensioned Tendons: Inline Density Measurements, a Thesis Submitted to the Faculty of University of Minnesota (Year: 2019).*

(Continued)

*Primary Examiner* — Michael J Dalbo
(74) *Attorney, Agent, or Firm* — HUSCH BLACKWELL LLP

(57) ABSTRACT

A method may comprise applying a magnetic field to an internal region of a tendon; acquiring a set of magnetic measurements at a surface proximal to the internal region; acquiring a set of electrical impedance measurements at the surface; calculating a set of expected filler defect-free impedance values for the surface from the set of magnetic measurements using a kernel; comparing the expected filler defect-free impedance values to the set of electrical impedance measurements; and identifying a filler defect within the tendon based on the comparison.

11 Claims, 10 Drawing Sheets

(56) References Cited

OTHER PUBLICATIONS

Bore et al., "Capacitive Probe for Non Destructive Inspection of External Post-Tensioned Ducts: Modelling by DPSM Technique," AIP Conference Proceedings, 2010, 1211:1983-90.
Gustave Eiffel University & Cerema et al., "Capteur Capacitif Pour Conduit de Précontrainte Extérieure," Document B5-2, Université Gustave Eiffel, 2015, 3 pages.
J. Iaquinta, "Contribution of Capacitance Probes for Nondestructive Inspection of External Post-Tensioned Ducts," e-Journal of Nondestructive Testing (eJNDT), 2004, 9 pages.
S. Schorn, "Grout Evaluation of External PT Tendons," National Bridge Preservation Partnership Conference, 2018, 45 pages.
Taillade et al., "The Capacitive Probe: Developing a Diagnostic Tool for External Prestressing Ducts," Bulletin des Laboratoires des Ponts et Chaussées, 2008,272:107-22.

* cited by examiner

SYSTEM AND METHOD FOR IMAGING TENDON CROSS SECTIONS FOR DETECTING FILLER FLAWS IN EXTERNAL TENDONS WITH FLEXIBLE FILLERS

CROSS-REFERENCE TO RELATED APPLICATION(S)

This application claims priority to U.S. Provisional Patent Application No. 63/715,359 filed on Nov. 1, 2024, the entire contents of which are incorporated herein by reference for all purposes.

STATEMENT REGARDING FEDERALLY SPONSORED RESEARCH OR DEVELOPMENT

This invention was made with government support under Project BED25-977-20 awarded by the Florida Department of Transportation under Federal Highway Administration funding. The government has certain rights in the invention.

BACKGROUND

Modern bridge construction frequently employs external post-tensioned tendons comprising encased steel strands to enable rapid and economical deployment of large-scale infrastructure. These tendons are typically filled with corrosion-protecting materials such as cementitious grout or flexible fillers. Historical failures of external tendons have been attributed to flaws in the fill material, including voids, water intrusion, foaming, and incomplete coverage, which compromise the protective barrier and expose the steel strands to corrosive environments. Such flaws have necessitated costly repairs and bridge closures.

In the United States, numerous bridges incorporate external tendons, with individual structures containing upwards of 1,000 tendons. Conventional imaging methods for evaluating tendon fill quality include penetrating radiation techniques such as X-ray and gamma-ray tomography. While these methods can identify flaws within the tendon cross section, they are slow, expensive, and require specialized equipment and safety protocols. Other available technologies based on electrical signal analysis lack imaging capability and do not reliably localize flaws within the tendon cross section.

Flexible fillers, including thixotropic gels, greases, waxes, and polymer-based compounds, have been adopted in place of cementitious grout in various state specifications, including those issued by the Florida Department of Transportation (FDOT). These materials accommodate minor tendon movements without cracking and are less prone to shrinkage. However, flexible fillers remain susceptible to flaws such as emulsification due to water ingress, leakage through anchors or joints, and void formation caused by entrapped air, thermal expansion, or improper venting during injection. Laboratory and field investigations have documented such flaws in wax-filled tendons, which can harbor moisture or contaminants and promote corrosion.

FDOT specifications require identification and remediation of voids within 24 to 48 hours following filler injection. Among flexible fillers, waxes are widely used and are available in macro-crystalline and micro-crystalline forms. Macro-crystalline waxes, such as paraffin wax, are derived from low-boiling petroleum distillates and consist primarily of straight-chain hydrocarbons or fatty-acid esters. These waxes exhibit large, needle-like or plate-like crystals and have a distinct melting point range between approximately 45° C. and 70° C. Micro-crystalline waxes, derived from heavier petroleum fractions, contain branched-chain paraffins, cyclo-paraffins, naphthenes, and alkylated aromatics. These waxes form smaller, rounder, and more amorphous crystals, resulting in a flexible material with a smooth texture that resists bleeding and separation over time.

SUMMARY

In some aspects, the techniques described herein relate to a method, including: applying a magnetic field to an internal region of a tendon; acquiring a set of magnetic measurements at a surface proximal to the internal region; acquiring a set of electrical impedance measurements at the surface; calculating a set of expected filler defect-free impedance values for the surface from the set of magnetic measurements using a kernel; comparing the expected filler defect-free impedance values to the set of electrical impedance measurements; and identifying a filler defect within the tendon based on the comparison.

In some aspects, the techniques described herein relate to a system including: a magnetic field generator configured to apply a magnetic field to a strand bundle within an internal region of a tendon; a magnetic response detector configured to acquire a set of magnetic measurements at a surface proximal to the internal region; an impedance measurement unit configured to acquire a set of electrical impedance measurements at the surface; a processor operatively connected to the magnetic response detector and the impedance measurement unit; and a non-transitory computer-readable medium storing instructions that, when executed by the processor, cause the processor to: calculate a set of expected filler defect-free impedance values for the surface from the set of magnetic measurements using a kernel; compare the expected filler defect-free impedance values to the set of electrical impedance measurements; and identify a filler defect within the tendon based on the comparison.

In some aspects, the techniques described herein relate to a non-transitory computer-readable medium storing instructions that, when executed by a processor operatively connected to a magnetic field generator, a magnetic response detector, and an impedance measurement unit, cause the processor to: apply a magnetic field to a strand bundle within an internal region of a tendon; acquire a set of magnetic measurements at a surface proximal to the internal region; acquire a set of electrical impedance measurements at the surface; calculate a set of expected filler defect-free impedance values for the surface from the set of magnetic measurements using a kernel; compare the expected filler defect-free impedance values to the set of electrical impedance measurements; and identify a filler defect within the tendon based on the comparison.

BRIEF DESCRIPTION OF THE DRAWINGS

To describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings.

Figure 1A:
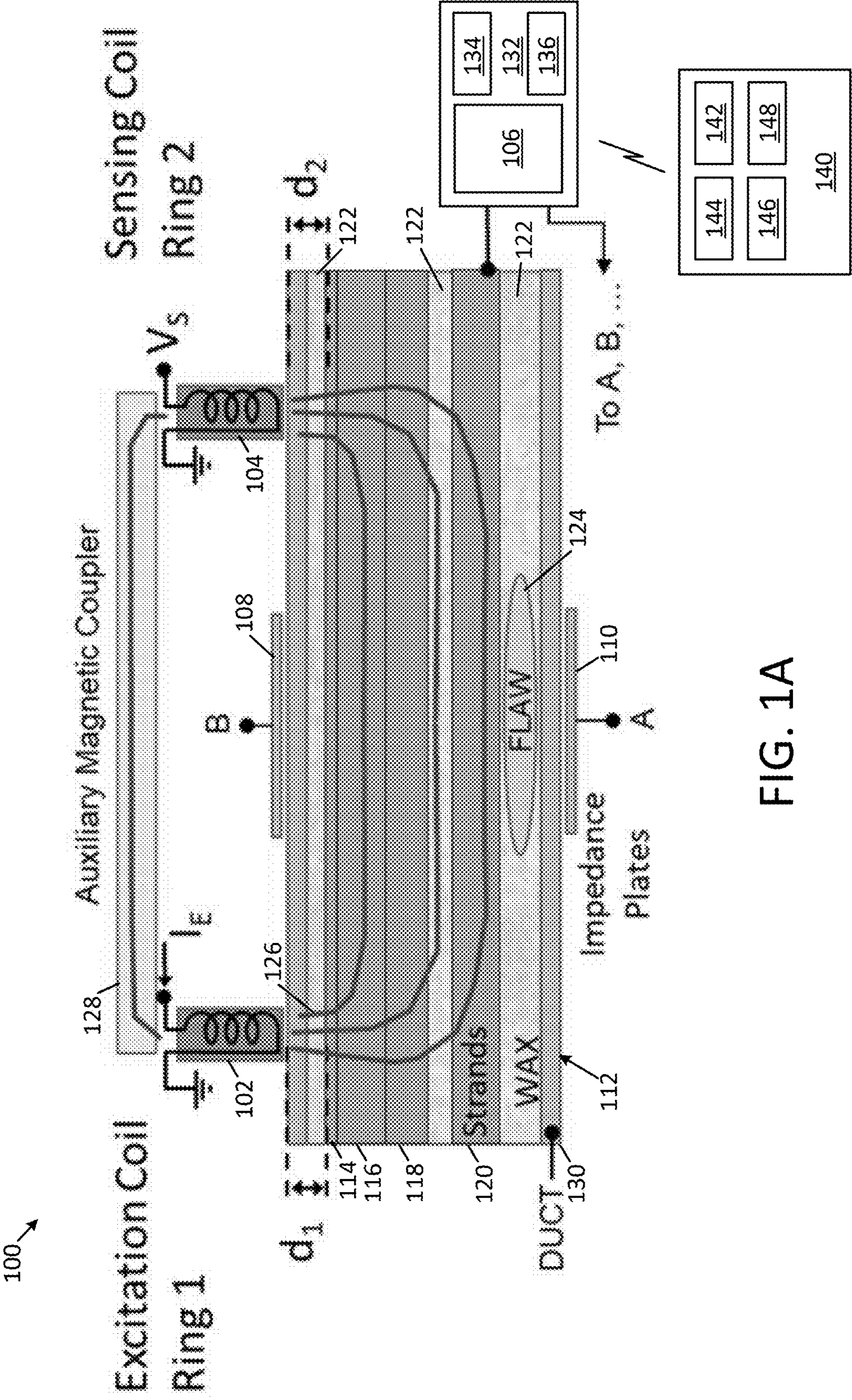
FIG. 1A illustrates an example implementation of a magnetic flux path between excitation and sensing coils within a tendon imaging unit.

Before explaining the disclosed embodiment of this disclosure in detail, it is to be understood that the invention is not limited in its application to the details of the particular arrangement shown, as the invention is capable of other embodiments. Example embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

External post-tensioned tendons, which house steel strand bundles within opaque ducts filled with flexible fillers such as wax, are critical structural components in bridges and other infrastructure. These fillers are intended to protect the steel strands from corrosion; however, they are prone to deficiencies such as voids, air bubbles, and water contamination, which compromise structural integrity. Traditional inspection imaging methods, including X-ray and gamma-ray imaging, are slow, expensive, and require specialized operators, making them impractical for routine or large-scale use. Moreover, these methods often fail to provide real-time feedback or spatial correlation between filler defects and strand positions. Existing electromagnetic and capacitive sensing technologies suffer from ambiguity in interpreting sensor signal due to overlapping influences from excitation and sensing coil positions, limiting their ability to accurately reconstruct the internal tendon geometry. Additionally, prior systems often require physical rotation of the sensor unit around the tendon, which complicates deployment and reduces inspection speed.

In some embodiments, the described tendon imaging system applies a transform to magnetic signals acquired from excitation coils and sensing coils distributed around the tendon circumference to determine an expected electrical signal (e.g., an expected impedance) in a defect-free condition. Various examples are described below with respect to the transform may comprising a convolutional kernel function. For instance, the kernel may be derived from finite element method (FEM) simulations of tendon configurations with known strand geometries and dielectric properties, encodes the spatial relationship between magnetic flux distortions and expected defect-free impedance profiles. The transformation may be implemented via Fourier domain convolution, wherein the magnetic signal vector is multiplied element-wise by the kernel's frequency representation and then inverse-transformed to yield the expected impedance profile. However, these examples are illustrative and any suitable transform may be applied. This approach may support direct mapping from magnetic to expected electrical behavior in the absence of defects. The resulting defect-free impedance profile may be compared to measured impedance values to identify deviations indicative of filler deficiencies such as voids, water intrusion, foaming, etc. Diagnostic thresholds may be applied to flag anomalies, and the system may annotate results with metadata including tendon diameter, strand count, and environmental conditions to support retrospective analysis and consultant review.

FIG. 1A illustrates an example of a tendon imaging tool 100 that images cross-sections of external post-tensioned tendons 112 to detect defects 124. In some examples, tendon imaging tools 100 may be deployed in civil infrastructure environments including but not limited to highway bridges, parking structures, stadiums, and high-rise buildings. In further examples, tendon imaging tools 100 may be used in marine or offshore platforms, where corrosion protection is critical. The tool may be applied near anchorages, mid-span regions, or any location where filler integrity is uncertain. In some implementations, the tool may be manually positioned or integrated into a robotic crawler system for automated scanning. The tendon imaging tool 100 may operate in confined spaces, such as beneath deck slabs or within box girders, and may be used during construction, maintenance, or forensic inspection phases.

In some examples, tendons 112 comprise an outer duct 130 through which a plurality of steel strands 114-120 extend. Once the tendon has been placed into position, the strands are tensioned to apply compressive force and provide rigidity to the surrounding structural elements. In some embodiments, the duct 130 is filled with a corrosion-preventing filler material such as wax 122, which surrounds the strands and electrically and chemically isolates them from the environment. Due to the tensioning of the strands, the spatial relationship between the strands and the inner wall of the duct remains substantially constant along moderate distances within the length of the tendon. This local geometric stability supports the use of spatially separated sensing components, such as a magnetic flux generator and a magnetic response detector, for imaging the tendon cross-section. In some examples, the magnetic signal response is acquired at a plurality of nearby second locations along the tendon using different coil pairs (see FIG. 1B), where each coil pair includes a generating device (e.g., excitation coil 102) and a sensing device (e.g., sensing coil 104).

Figure 1B:
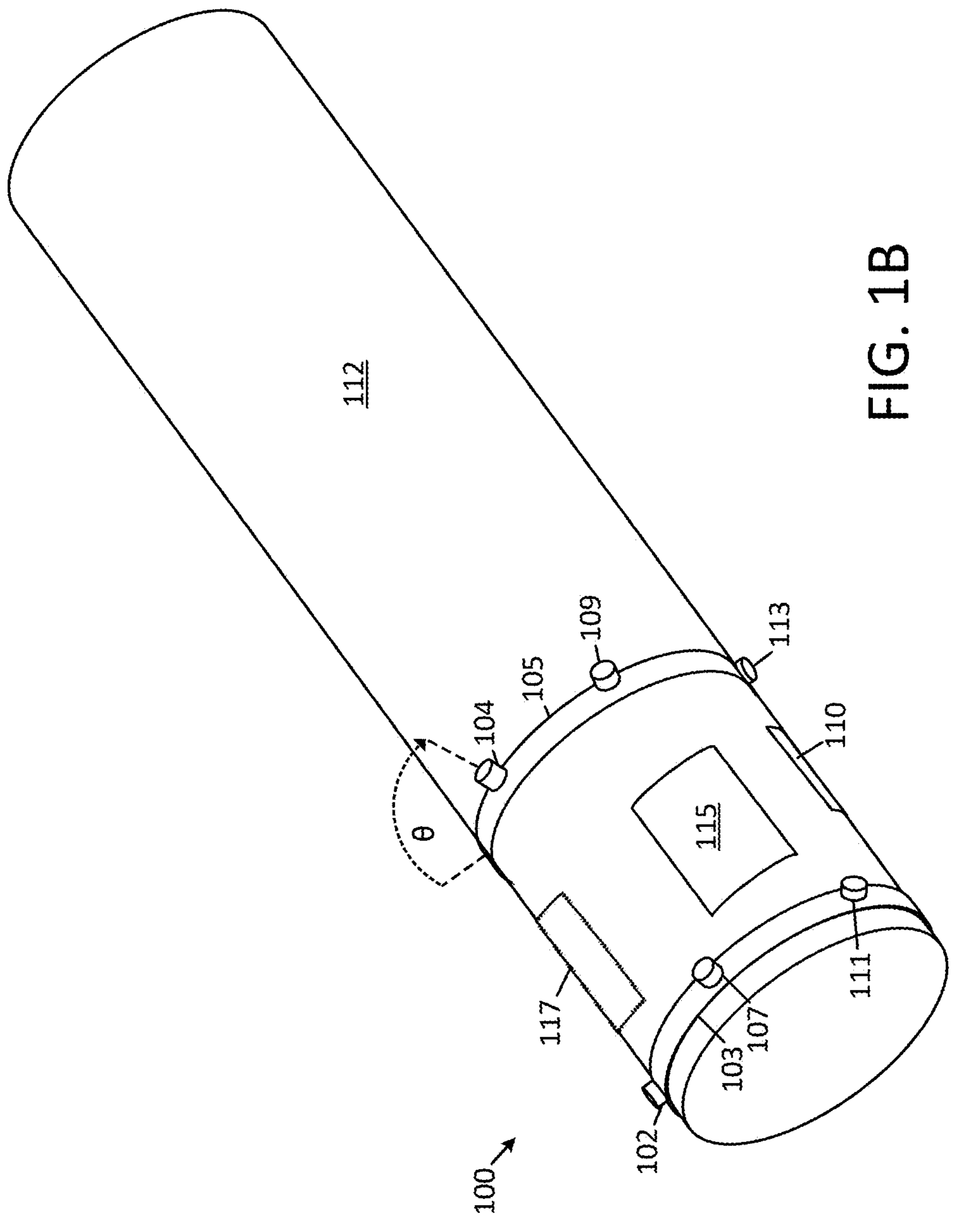
FIG. 1B illustrates an example implementation of a clam-shell-style tendon imaging unit including coil arrays and impedance plates.

In some embodiments, the tendon imaging tool 100 includes a magnetic field generator and a magnetic response detector. The magnetic field generator may include one or more excitation coils 102 that apply a time-varying current to generate magnetic flux 126 within the tendon 112. As illustrated in FIG. 1A, the magnetic flux 126 propagates through the duct 130 and interacts with the steel strands 114-120 embedded in the filler material 122. The magnetic permeability of the strands causes localized distortion of the magnetic field, which may include attenuation, phase shift, and spatial redirection of the flux lines. These distortions vary depending on the number, position, and orientation of the strands, as well as the dielectric properties of the surrounding filler. In some examples, the magnetic flux generator may operate at a fixed frequency or across a range of frequencies to enhance sensitivity to different defect types. The magnetic response detector may include one or more sensing coils 104, which measure the induced voltage resulting from the distorted magnetic flux. In further examples, the magnetic response detector may include additional magnetic sensors such as fluxgate magnetometers, Hall effect sensors, or magneto-inductive probes. The sensing coils 104 and excitation coils 102 may be arranged in clamshell mounted circumferential rings around the tendon, as shown in FIG. 1B, and may be rotated relative to each other to increase angular resolution. In this example, the magnetic signal response acquired by the magnetic response detector is represented as a magnetic signal vector $F(\alpha)$, which varies with angular position $\alpha$ and forms the basis for computing the expected impedance profile. As discussed below, in some embodiments, the magnetic signal vector $F(\alpha)$, acquired by the magnetic response detector, is used to compute an expected impedance profile $Z_0(\alpha)$ representing the impedance that would be measured in a filler defect-free tendon cross-section.

In this example, two coils 102, 104 are positioned at a certain longitudinal distance from each other and the same transverse vertical distance from strands. One of the coils (primary) is excited by passing an alternating current through it. The alternating magnetic field produces a changing magnetic flux through the ferromagnetic strands within the tendons. The changing magnetic flux passing through the strands excites the coil (secondary coil) in the pair. The EMF induced in the secondary coil is measured, and the signal strength compared for different angular positions of the coil pair around the tendon. That signal is smaller or larger if the strand envelope is respectively farther or closer to the coil pair. If instead of having only one pair, but rather multiple coil pairs placed at various regularly spaced angles around the tendon, a group of individual signal strengths from all those pairs may be obtained. That group information can then be used to recover in each case the depth of the strand envelope from the outer surface. An image of that envelope can then be created, without needing to rotate the coil pairs, greatly facilitating image acquisition.

In some embodiments, tendon imaging tool 100 includes an auxiliary magnetic coupler positioned circumferentially around tendon 112, as shown in FIG. 1. The auxiliary magnetic coupler comprises a conductive or ferromagnetic structure, such as but not limited to a metallic wrap, foil, segmented band, or laminated sheet, fabricated from materials including aluminum, copper, or iron-based composites. The auxiliary magnetic coupler provides a continuous magnetic path that guides magnetic flux 126 around tendon 112. In further examples, the coupler is affixed to the interior surface of tendon imaging tool 100 or loosely placed in proximity to impedance plate 108 and impedance plate 110. Magnetic flux 126 generated by alternating current excitation interacts with strands 114-120 and filler material wax 122. When strands 114-120 are unevenly distributed within tendon 112, such as when they are bunched toward one side of the duct, the resulting capacitive coupling between the strands and impedance plate 108 varies spatially. This variability can affect measurements acquired by impedance meter 106. The auxiliary magnetic coupler compensates for such geometric asymmetries by stabilizing magnetic flux 126, which in turn reduces variability in capacitive coupling and improves the fidelity of impedance-based filler defect detection.

In further examples, the auxiliary magnetic coupler may be added based on tendon configuration parameters such as strand count, duct diameter, or filler type, which may be entered by the operator via user interface 148. In some aspects, the coupler may be deployed automatically or manually when the measurement mode selected by the operator requires enhanced flux uniformity, such as high-resolution impedance mapping or mutual inductance characterization. Additionally, processor 144 may execute diagnostic routines that compare measured impedance values to expected profiles derived from magnetic measurements. If the deviation exceeds a predefined threshold and cannot be resolved by kernel interpolation or signal filtering, the system may generate an alert on user interface 148 indicating that a proper reading could not be established and recommending attachment of the auxiliary magnetic coupler. This alert may include visual indicators, such as a flashing icon or color-coded warning, and may be accompanied by textual guidance or audio prompts. The operator may then attach the coupler and reinitiate the scan, with the system logging the configuration change and updating the kernel selection accordingly. This adaptive workflow supports robust operation across diverse tendon geometries and enhances measurement reliability in challenging field conditions.

In reference to FIG. 1B, multiple examples illustrate how magnetic and impedance measurements may be acquired at different longitudinal positions along a tendon 112 using various configurations of excitation coils 102, sensing coils 104, and impedance plates 108 and 110. In some embodiments, the tendon imaging tool 100 includes a collar 103 of excitation coils 102 and a separate collar 105 of sensing coils 104, wherein the two collars are spaced apart along the longitudinal axis of the tendon 112. For example, the first collar 103 may be disposed around a first circumference of the tendon 112 and the second collar 105 may be disposed around a second circumference of the tendon 112. Here, the region between the two collars may comprise an internal tendon region to be imaged. The collars may be deployed in various manners, such as repositioned manually, mounted on a motorized carriage or robotic crawler that traverses the tendon surface, etc. In some examples, the collars 103, 105 may comprise rigid structures that open and close via a clamshell arrangement. For instance, the collars 103, 105 may each comprise a hinge, permitting the collars to be opened to be placed around the tendon. As another example, the collars 103, 105 may comprise multiple pieces that may be attached together to surround the tendon. In still further implementations, the collars 103, 105 may be two components of a single sleeve (e.g., a rigid clamshell sleeve) that covers the entire region between the collars. The detachable clamshell arrangement may facilitate quick placement or re-positioning of the system 100 on various locations along the tendon 112. Additionally, with no moving parts and low-profile coils 102, 104, the unit 100 may be deployable in narrow or difficult to access spaces.

In additional embodiments, the excitation and sensing coils may be distributed as individual units, and placed at selected locations along the tendon. Each unit may include a local power source, signal acquisition circuitry, and wireless communication interface. The units may operate independently or in coordination, and may be deployed manually or using automated placement tools. In some examples, the units may be affixed to the tendon surface using adhesive pads, magnetic clamps, or mechanical fasteners. The spatial arrangement of the units may be determined based on structural geometry, expected flaw locations, or inspection protocols.

In some embodiments, the excitation coils 102 and sensing coils 104 are arranged in circumferential collars around the tendon 112, with each collar comprising a plurality of coils spaced at regular angular intervals. The number of coils in each collar may vary depending on the desired spatial resolution, the diameter of the tendon, and the expected flaw characteristics. For example, in one implementation, each collar may include six coils spaced at 60° intervals, while in other examples, collars may include eight, ten, or twelve coils to achieve finer angular sampling. Each coil may have a diameter between 0.5 inches and 1.5 inches, and may include a ferromagnetic core to concentrate the magnetic flux. The longitudinal spacing between the excitation and sensing collars may range from 3 inches to 6 inches, depending on the tendon geometry and the imaging depth required. Additionally, the coils may be operated in interchangeable modes, such that excitation coils 102 may function as sensing coils 104 and vice versa, allowing mutual inductance characterization and expanded measurement configurations. In some aspects, a single excitation coil 102 may be paired with multiple sensing coils 104, or multiple excitation coils may be paired with a single sensing coil, thereby increasing spatial sampling density and accommodating geometric constraints. These configurations may be selected based on the structural symmetry of the tendon, the number of strands, and the dielectric properties of the filler material 122.

In some aspects, the impedance measurement unit may also be implemented using movable or distributed configurations. For example, a single impedance plate 108 may be repositioned along the tendon using a manual or motorized mechanism (e.g., as described below with respect to FIG. 1C). Measurements may be taken at regular intervals or triggered by sensor feedback. In further examples, a collar containing multiple impedance plates 110, 115, 117 may be positioned on the tendon, with each plate acquiring signals at its respective angular location. For instance, the collar may comprise a hinged or multi-piece rigid clamshell-style collar. In additional embodiments, individual impedance plates may be deployed as standalone units. Each plate may coupled to signal generation and measurement circuitry, and may communicate with sensing system 132 and/or computer 140.

In alternative implementations, the excitation coils 102 and sensing coils 104 may be operated in interchangeable modes. For example, in some embodiments, one or more excitation coils 102 may be operated in a sensing mode, and one or more sensing coils 104 may be operated in an excitation mode. Additionally, the number of excitation coils 102 may differ from the number of sensing coils 104. In some embodiments, a single excitation coil 102 may be paired with multiple sensing coils 104, or vice versa, such that certain coils are reused across multiple measurement pairs. In further embodiments, the excitation collar and the sensing collar may be positioned with a circumferential phase offset θ, defined as the angular displacement between the respective coil arrays around the tendon axis. The phase offset θ may be fixed and selected to provide complementary spatial coverage of the tendon cross-section. The value of θ may be selected based on the number of coils, the desired imaging resolution, or the symmetry of the tendon structure.

In some embodiments, the tendon imaging tool 100 includes a controller 132 that manages signal acquisition, sensor activation, and communication with the processor 144. The controller 132 may include analog-to-digital converters, signal conditioning circuits, and embedded firmware for real-time control. The communication interface 136 may include wired or wireless links, such as but not limited to USB, Ethernet, or Bluetooth, and may support signal streaming, remote control, and firmware updates. In some implementations, the controller 132 may also perform preliminary signal filtering or compression prior to transmission to the processor 144.

Computer 140 receives signals from sensing system 132 via a tethered cable or, in some implementations, through a wireless communication link. The signals include magnetic and impedance measurements sampled at discrete angular positions around the tendon cross-section. In some embodiments, the computer 140 includes a processor that executes software routines written in Python to perform convolutional transformations, Fourier analysis, and image reconstruction. The processor may be a general-purpose microprocessor or a low-cost embedded chip, and the system does not require high-performance computing hardware. The imaging software may produce cross-sectional maps of the tendon in real-time, such as within one to two seconds after signal acquisition. In further aspects, computer 140 includes memory that stores imaging software, reconstruction kernels, and archived scans. The memory may also contain a library of precomputed kernels.

In some embodiments, cross-sectional reconstruction of the tendon interior is performed by combining strand envelope geometry derived from magnetic sensing coils 104 with filler condition data obtained from impedance plates 108 and 110. The magnetic signal data are processed to estimate the distance between each sensing coil and the strand bundle envelope, producing a vector of envelope-to-coil distances that define the spatial configuration of the steel strands within the tendon. Simultaneously, impedance measurements are acquired between each plate and the strand bundle using high-frequency alternating current, with the resulting complex impedance values reflecting the dielectric properties of the filler material 122. At each angle, the complex normal current density $\vec{J}_n$ may be determined over the plate surface and integrated to obtain the total normal complex current $\tilde{I}_n$. The impedance Z may then be determined using the relation:

$$Z = \frac{V}{\tilde{I}_n}$$

where V is the applied electrical potential at the plate.

These impedance values vary depending on the presence of defects such as air voids or water intrusion, which alter the dielectric constant and thereby the measured impedance modulus. The combined sets are used to generate a composite image of the tendon cross section, wherein the strand envelope is overlaid with a color-coded map of filler condition. In some examples, regions of intact wax filler are rendered in one color, while areas exhibiting elevated impedance (indicative of air voids) or reduced impedance (suggestive of water intrusion) are rendered in contrasting colors. The resulting image may be displayed on user interface 148 for immediate review, and may also be stored for subsequent analysis.

In some embodiments, the tool 100 records magnetic signals acquired by the excitation coils 102 and sensing coils 104, as well as impedance measurements obtained via impedance plates 108 and 110, and stores this in memory 146 of computer 140 for deferred processing. For instance, this may be utilized when the tendon configuration encountered during inspection does not correspond to any of the modeled cases for which kernel functions are available in memory 146 or accessible by processor 144. In such cases, the stored magnetic signal vector and impedance measurements may be retained for post-processing once a suitable kernel function is derived. For example, finite element modeling may be performed externally or within computer 140 to simulate the specific tendon geometry and filler conditions, thereby generating a new kernel function tailored to the recorded configuration. The processor 144 may then apply the convolution to recover the expected impedance profile for comparison with the measured impedance. This deferred processing workflow enables diagnostic analysis even when real-time kernel matching is not feasible. Additionally, controller 132 may annotate the stored information with metadata such as tendon diameter, strand count, environmental conditions, and sensor calibration parameters to support accurate kernel generation. The computer 140 may export formats compatible with external modeling platforms or consultant review systems. In further examples, the recorded information may be transmitted to a centralized processing facility or consultant workstation for kernel derivation and flaw analysis.

Computer 140 also includes a user interface 148 that provides real-time visualization of imaging results and allows operator input. The user interface 148 may include a display screen, keyboard, touchscreen, or other input devices. The user interface 148 may also allow the operator to input tendon parameters such as strand count, materials, tendon dimensions, filler types, strand diameter, etc., which are used to select the appropriate kernel from the library. In some embodiments, the user interface 148 supports annotation of detected flaws, export of imaging information, and logging of scan sessions. The system may store measurement files locally and allow review by consultants in cases of uncertain results. Additionally, the interface may include calibration tools and diagnostic indicators to assist with system setup and operation. As an example, these computations may be performed by a processor 144 that receives magnetic signals from the sensing coils 104 and impedance measurement data from the impedance meter 106. The processor 144 is operatively connected to both the magnetic response detector and the impedance measurement unit, and may access a non-transitory computer-readable medium 146 storing instructions that, when executed, apply a kernel to the magnetic signal vector to compute the expected impedance value. In some examples, the system includes an interface configured to receive tendon parameters including a number of strands, duct diameter, and filler type. As discussed below, the processor 144 may select the appropriate kernel function based on the received parameters.

In some embodiments, the computer 140 may include any suitable computing system that executes instructions and manages data, such as but not limited to a desktop workstation, laptop, tablet, smartphone, embedded computing module, or server-class system. The processor 144 may include one or more processing units, such as central processing units (CPUs), graphics processing units (GPUs), digital signal processors (DSPs), or field-programmable gate arrays (FPGAs), and may operate in native, virtualized, or container-based execution environments. For example, in server-based implementations, processor 144 may execute software routines within isolated virtual machines or container instances managed by a resource scheduler. The memory 146 may include volatile memory such as dynamic random-access memory (DRAM), non-volatile memory such as flash or phase-change memory, or combinations thereof, and may store runtime data structures, kernel libraries, and intermediate signal processing results. The computer 140 may also include persistent storage devices such as solid-state drives (SSDs), hard disk drives (HDDs), or distributed file systems, which may retain magnetic signal information and impedance measurements for deferred analysis. In some examples, computer 140 may be physically integrated into the Tendon Imaging Unit 100, while in other examples, it may be remote and connected via wired or wireless communication links. The controller 132 may coordinate data acquisition from excitation coils 102, sensing coils 104, and impedance plates 108 and 110, and may transmit the acquired data to computer 140 for processing or archival. In further examples, computer 140 may export recorded data in standardized formats such as comma-separated values (CSV), hierarchical data format (HDF5), or JavaScript Object Notation (JSON), enabling compatibility with external modeling platforms and consultant review tools. The system may also support secure data transmission protocols for remote analysis, including but not limited to encrypted file transfer, virtual private network (VPN) tunneling, or authenticated cloud synchronization. Accordingly, the computing architecture may be tailored to the deployment context, ranging from portable field units to centralized cloud-based processing systems.

In some embodiments, the computer 140 may include a portable computing device such as but not limited to a smartphone, tablet, or laptop computer operated by inspection personnel at a field site. In these examples, computer 140 may communicate wirelessly with controller 132 to receive magnetic signal data from excitation coils 102 and sensing coils 104, as well as impedance measurements from impedance plates 108 and 110. The processor 144 may include a mobile system-on-chip (SoC) or general-purpose CPU capable of executing signal processing routines, convolutional kernel transformations, and graphical rendering operations. The memory 146 may include embedded DRAM or flash memory sufficient to store raw data, intermediate results, and preloaded kernel libraries. In some aspects, computer 140 may display real-time tomographic images of tendon cross sections on a touchscreen interface, allowing inspection personnel to annotate, zoom, or flag regions of interest. The device may also store inspection metadata such as GPS coordinates, timestamp, operator ID, and environmental conditions, which may be associated with the acquired data for traceability and post-processing. In further examples, computer 140 may transmit the recorded data to a remote server or centralized repository for archival or deferred analysis, using cellular, Wi-Fi, or satellite communication protocols. The software executed by processor 144 may include a graphical user interface (GUI) for controlling acquisition parameters, initiating scans, and reviewing diagnostic outputs.

As discussed above, any suitable technique for acquiring the magnetic and electrical information may be employed. As another example, the signals may be acquired via a rotational tendon imaging a rotational tendon imaging unit (TIU) 130, such as the type described in U.S. Pat. No.

11,692,959, the contents of which are hereby incorporated in their entirety. In one embodiment, a magnetic sensor assembly 152 and an impedance sensor assembly 151 are accommodated at opposite points of a circumference of a rotating shell 160, thereby creating an imaging unit that can slide along successive places on the tendon length. Accordingly, in various embodiments, a mechanism comprising the shell member 160 can be temporarily mounted to a tendon 112 in a desired position along its length. As discussed, the tendon 112 includes a duct 130 that surrounds multiple steel strands 160 and filler 122. In the illustrated embodiment, the shell member 160 rotates around the tendon 112.

In one embodiment, a magnet 154 is positioned in a center of an array of four ball-bearing rollers, keeping a nearly steady magnet face to outer duct surface distance of the tendon 112. The presence of the ferromagnetic steel strands 160 in the tendon 112 can produce a measurable attractive force on the magnet 154. By affixing the magnet 154 to a load cell 153 (or other type of force measuring sensor) positioned so that the disk face of the magnet 154 is normal to the radius of the tendon cross section and by keeping the shell assembly 160 at a fixed distance to the external surface of the tendon duct 130, the TIU 100 is configured to measure an amount of attractive force produced by the steel strands 160.

In one embodiment, a sensing plate 155 of the impedance sensor assembly 151 is metallic and may be made of articulated stainless steel elastic segments. The sensing plate 155 can be pressed closely against the surface of the duct 130 by one or more springs in series. At any selected place along the tendon 112, the combined action of a spring, flexible capacitive sensing plate 155 and bearings permitted smooth, hand actuated rotation of the TIU 100 while maintaining steady dimensional positioning of the sensors with respect to the tendon perimeter. Signal conditioning and initial processing can take place on an onboard electronic microcontroller 165, which includes a gyroscope "G" and an accelerometer "A" (that act as an angular positioning module) to keep track of angular position and data to adjust for gravitational and centripetal forces. Further processing can be handled by executable software at a computer 140 connected to the traveling combined TIU unit 100.

For the magnetic module 110 and measurements, a disk-shaped permanent magnet 154 (with magnetization normal to the disk face) placed near the external duct surface is operable to provide a magnetic field of sufficient reach into the tendon 112. The presence of the ferromagnetic steel strands 160 in this field produces a measurable attractive force on the magnet 154. The amount of attractive force is greater or smaller if the strand bundle surface was nearer or further respectively away from the magnet 154. The force-distance behavior follows well-established relationships, so the force measurement can be readily converted into a radial distance value. Thus, the magnetic measurements together with the corresponding rotation angle values provided precise information on the location of the strand bundle envelope within a polymer duct 130, creating an image of the bundle inside the duct 130.

In an exemplary embodiment, load cell data (involving the attractive forces produced by the tendon strands 160) can be saved synchronous with a time array. The recorded force values are the result of convolution of the actual force values with the step function response of the magnetic sensor 110—an effect not unlike motion blur in a photograph with a panning camera.

The electrical impedance (modulus), |Z|, measured by an impedance meter or monitor 128 of the TIU unit 100, is that of the capacitor formed between the metallic sensing plate 155 hugging the external surface of the tendon 112 and the metallic strand assembly inside the tendon 112. The measured impedance values may be compared to impedance values that would be expected in a defect-free filler condition. The magnetic measurements determined via the load cell 153 may be used to determine these expected impedance values. The comparison may be used to determine filler condition, which may then be used to color-code the space between the duct inner wall and the strand bundle in the image produced by the magnetic sensor assembly 110. The result is a near real-time cross section image of the tendon 112 on the display of the processing computer 140, with filler deficiencies identified by color mapping.

Figure 1C:
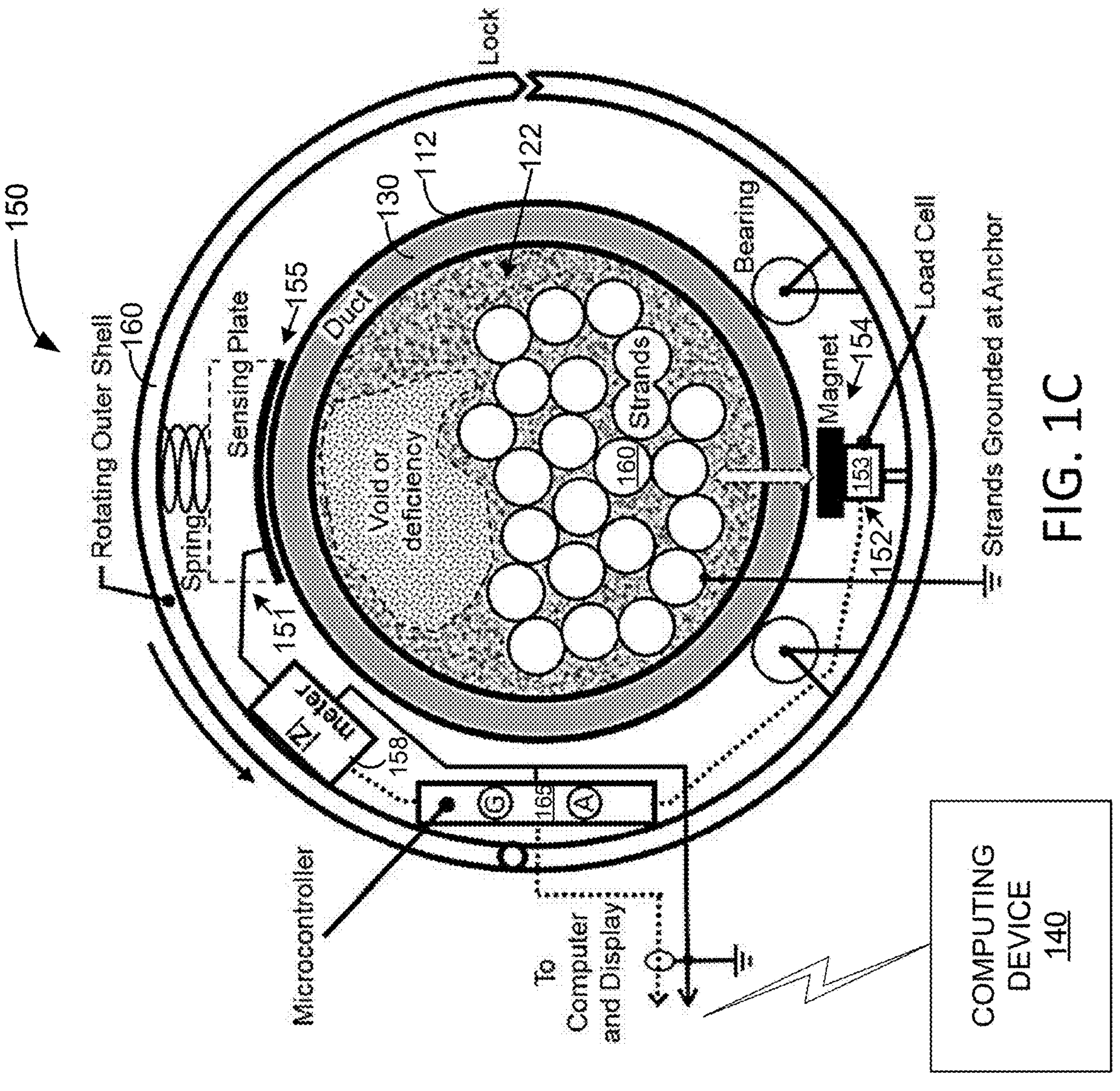
FIG. 1C illustrates an example implementation of a rotational-style tendon imaging unit including magnet, load cell, and impedance plate.
Figure 1D:
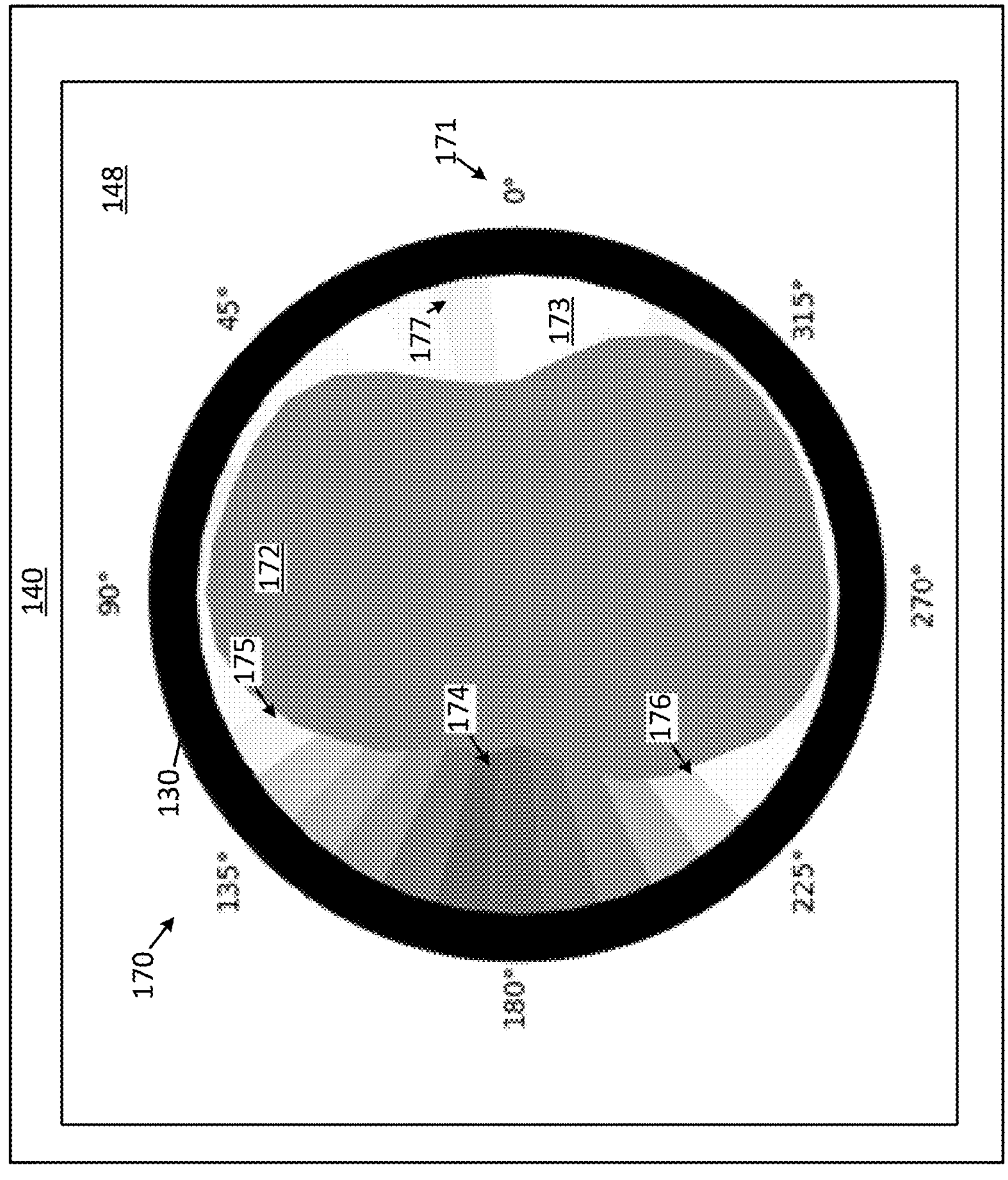
FIG. 1D illustrates an example display of results of a tendon scan.

FIG. 1D illustrates an example display of results of a tendon scan. For instance, FIG. 1C may represent an example of a display that may be shown on user interface 148 of computer 140. As another example, FIG. 1C may represent a display shown on a remote computer/server after data transmission from a computer 140. In still further examples, FIG. 1C may provide a visual representation of data that may be used to provide results of a tendon scan (e.g., a representation of data used to trigger an alert, etc.).

In this example, a cross section 170 of a scanned tendon (e.g. tendon 112) is displayed via interface 148. For instance, the cross section 170 may correspond to a region measured via inductor plates 117, 115, 108, 110 in an example as described with respect to FIGS. 1A and 1B. Alternatively, the cross section 170 may correspond to the region measured via inductor plate 155 in a rotational measurement modality as illustrated in FIG. 1C.

In this example, results are provided with respect to an angular position 171. The region 172 represents a computed envelope for the tendon strands (e.g., the strands are computed to be positioned within region 172). Regions 173 visually indicate (e.g., via blank or white fill) angular regions in which impedance measurements are within a threshold of flaw-free expected measurements (see below).

Regions 174-177 indicate angular regions that differ from the flaw-free expected impedance by more than the threshold amount (e.g., regions with potential voids). In this example, detection regions 174-177 are shaded according to the amount by which they exceed the threshold, with region 174 having the highest measured impedance (e.g., the darkest shade has the strongest indication of a filler defect). Accordingly, in the illustrated example, the region 150° between 220° (between 175 and 176) and the region 5° between 15° (177) are identified as having potential filler defects. In the illustrated example, the visual has a 10° resolution. Of course, the resolution may be vary in practice and may be determined based on various conditions, such as number/size of impedance plates, tendon configuration, data quality, etc. In further examples, other filler defects may be indicated in cross section 170. For instance, a second color may be used to illustrate detected water intrusion (e.g., blue shaded wedges otherwise similar to 174-177).

Figure 2:
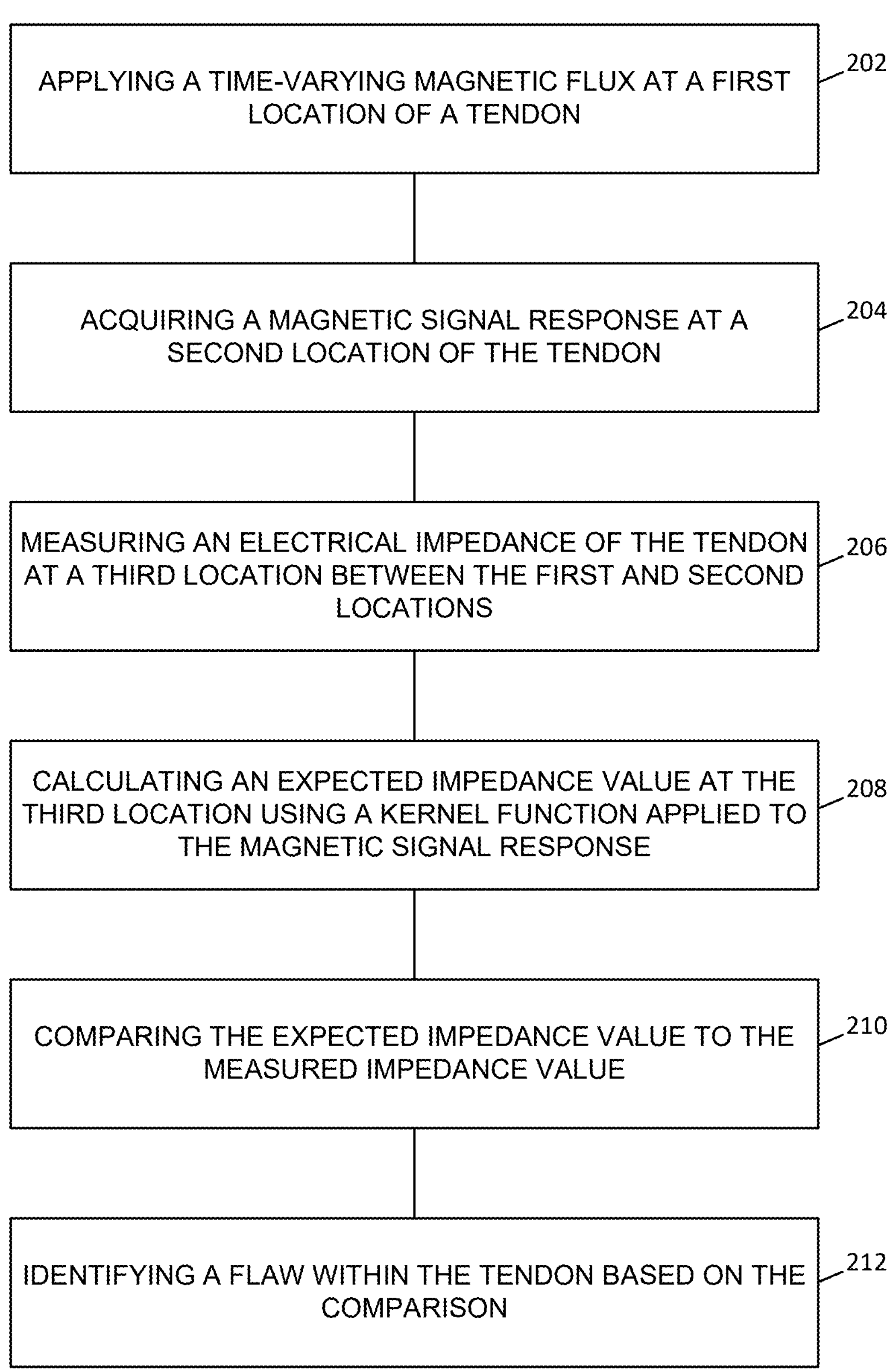
FIG. 2 illustrates an example method for detecting filler deficiencies using magnetic and impedance measurements.

FIG. 2 illustrates a method for detecting flaws within a tendon using magnetic and impedance-based measurements. The method may be implemented using various hardware configurations and sensing modalities. As an example, the method may be practiced using the tendon imaging tool 100 illustrated in FIGS. 1A through 1B. As another example, the method may be practiced using the tendon imaging tool 150 of FIG. 1C.

At step 202, a magnetic field is applied to an internal region of the tendon. For instance, a plurality of excitation coils 102, 107, 111 may be used to apply a time-varying magnetic flux at various locations around the circumference of the tendon. The excitation coils may be driven by an alternating current (AC) signal generator operating at a frequency within a range of approximately 100 Hz to 500 Hz (e.g., 185 Hz). As another example, step 202 may include applying a magnetic field via a magnet 154 of a rotational imaging unit 150.

At step 204, magnetic measurements are acquired at various locations around the circumference of the tendon. In some examples, the measurements may be acquired via a plurality of sense coils 104. As another example, the measurements may be acquired via a load cell 153 with measurements taken along the circumference as the unit 160 is rotated around the circumference of tendon 112. In some such examples, an accelerometer and/or gyroscope of a microcontroller 165 may be used to determine angular positions at which to take measurements at predetermined angular positions around the circumference. As another example, accelerometer/gyroscopic measurements may be used to interpolate measurements taken around the circumference to determine magnetic values at the predetermined angular positions.

In some examples, the measurement positions may be axially or angularly displaced from the positions in which the magnetic field is applied. For instance, in an implementation where the coils 102, 104 are mounted on collars, the collars may be oriented with a circumferential phase offset θ between the excitation and sensing collars, such as 30°, 45°, or 60°, which may enhance spatial coverage. In other examples, the measurement and application positions may be coincident. For instance, in the example unit 150, where the load cell 153 acquires the magnetic measurements at the same tendon surface position where the magnet 154 applies the field.

As an example, with respect to the implementation of FIG. 1B, measurements of $V_S$ may be obtained successively for each of the coil pairs 103, 105 around the tendon, using automatic multiplexing circuitry to transfer the excitation current (kept at a constant value) and voltage sensing action to the next coil pair in the sequence. This results in a vector of sensing values $V_{SV}=[V_{S1}, V_{S2}, \ldots V_{SN}]$, where N is the number of coils in either ring. The corresponding vector of estimated envelope-to-coil distance values $d_{EV}=[d_{E1}, d_{E2}, \ldots d_{EN}]$ is obtained using an approximate functional relationship between $V_S$ and $d_E$. A graphic polar image representation of dE as function of orientation angle with appropriate offset can then be made to provide an approximation of the shape and position of the strand envelope inside the tendon. Here, angular resolution (in Radians) of the determinations is in the order of 2π/N. Similarly, in an example where one or more sensors are rotated manually or automatically around the tendon, the vector of sensing values may be determined via an accelerometer used to determine distributed angular locations around the circumference of the tendon. For instance, the measurements may comprise a vector of load cell measurements ($L_{SV}=[L_{S1}, L_{S2}, \ldots L_{SN}]$, where N is number of sample positions around the circumference of the tendon.

At step 206, a set of electrical impedance measurements are acquired at the tendon surface proximal to the region in which a magnetic field is applied. In some examples, such as illustrated in FIGS. 1A and 1B, the electrical impedances are measured at circumferential locations between the first and second locations. In other examples, such as illustrated in FIG. 1C, the impedance measurements may be obtained at positions along the same circumference as the magnetic measurements, but displaced along the circumference by some known angle. In some examples, accelerometer data may be used to measure at particular known angles along the circumference, or the data may be used to interpolate measurements at other angles to reflect the values at the desired angles. The measured impedance may include real and imaginary components and may vary with the dielectric constant, conductivity, and homogeneity of the filler material. The operating frequency for impedance measurement may be any suitable value, such as between multiple GHz (e.g., 10, 100, or higher) and 0 Hz. For instance, suitable values may include approximately 100 kHz, 1 MHZ, 1 GHz, etc. At step 208, an expected impedance profile is calculated using a transformation function applied to the magnetic measurements. For instance, the expected impedance value may be a set of impedance values for that would be expected if the internal region of the tendon being imaged was free of filler defects. The estimation of $Z_0(\alpha)$ from $F(\alpha)$ may be based on data regarding tendon diameter, duct wall thickness, number and size of strands, and dielectric constants of the wax and duct materials. In some cases, the transformation may be modeled as a convolution of $F(\alpha)$ with a master kernel $K(\beta)$, assumed to be invariant across strand geometries.

In some embodiments, the transformation from magnetic signal data to expected impedance profiles is performed using a convolutional kernel method. Let $F(\alpha)$ denote the magnetic force signal as a function of angular position α, and let $Z_0(\alpha)$ represent the impedance profile that would be observed in a void-free tendon. In some examples, the expected impedance profile $Z_0(\alpha)$ may be calculated using convolution and Fourier transform techniques. With Z and F represented as vectors $Z_1, \ldots, Z_n$ and $F_1, \ldots, F_n$, indexed by α, the convolution is expressed as:

$$Z_0(i) = (F * K)_i = \sum_u F_u K_{i-u+1} \quad \text{(Eq. 1)}$$

$$FT(F * K) = FT(F) \cdot FT(K) \quad \text{(Eq. 2)}$$

$$FT(K) = FT(F * K)./FT(F) \quad \text{(Eq. 3)}$$

Where "*" denotes convolution, "." denotes term-by-term multiplication and "./" denotes term-by-term division. If K is a master kernel applicable to all cases, then FT(K) can be determined by selecting one instance of a fully wax-filled tendon, measuring or simulating the corresponding Z and F vectors, computing their Fourier transforms, and applying Eq. 3. For any other void-free tendon instance, the impedance profile $Z_0(\alpha)$ may be recovered from the magnetic profile $F(\alpha)$ using inverse Fourier transform:

$$Z_0(\alpha) = IFT(FT(F) \cdot FT(K))$$

This technique may allow efficient computation via element-wise multiplication in the frequency domain.

In some embodiments, the kernel function is selected from a kernel library comprising a plurality of precomputed kernels, each corresponding to a tendon configuration defined by a set of parameters including, for example, duct diameter, strand count, strand diameter, and filler dielectric properties. The kernel library may be constructed using finite element method (FEM) simulations that generate paired magnetic and impedance datasets for each configuration. In further examples, multiple FEM datasets corresponding to similar configurations are averaged to produce a master kernel representative of a tendon family. To support practical deployment across a range of tendon geometries, a library of kernel functions may be developed for different tendon sizes and strand configurations. Each kernel in the library corresponds to a specific tendon family characterized by parameters such as outer diameter, duct wall thickness, number and size of strands, and dielectric properties of the filler material. Examples include 10, 13, 15, 23, and 27 strands, with diameters such as 3.5 inches and 4.5 inches, etc. These configurations are common in bridge tendons and are used to interpolate or select appropriate kernels for defect detection. For example, kernels may be generated for tendons with 12 half-inch strands, 10 0.6-inch strands, and so on. FEM simulations are performed for each configuration under full wax fill conditions to generate paired magnetic and impedance datasets. These datasets are used to compute individual kernels, which are then averaged to produce a master kernel for each tendon family. The kernel size, defined by the number of angular samples N, may range from 6 to 100 or more depending on the resolution of the magnetic sensing array. Larger kernels provide finer angular resolution but require more computational resources and may be sensitive to noise.

In additional embodiments, when the tendon under inspection does not match any configuration explicitly represented in the kernel library, a kernel function may be estimated by interpolation. The interpolation may be performed using weighted averaging of neighboring kernels in a multi-dimensional parameter space defined by tendon geometry and material properties. The interpolation weights may be determined based on Euclidean or other distance metrics computed between the input tendon parameters and the parameters of the available kernels. The resulting interpolated kernel may be used in place of a directly matched kernel.

At step 210, the expected impedance profile is compared to the measured impedance profile. For instance, measured impedance $Z(\alpha)$ may be compared to the expected impedance $Z_0(\alpha)$ to identify flaws 124. For example, a void-like defect may be identified at angular position $\alpha_v$ if:

$$Z(\alpha_v) > Z_0(\alpha_v) + Z_u$$

where $Z_u$ is a threshold uncertainty value that may be determined according to various sources of measurement uncertainty or otherwise preconfigured. The results may be used to generate a flaw map of the tendon cross-section at various angles $\alpha_v$. In further examples, comparison may be implemented using thresholding, statistical inference, or machine learning techniques. In some examples, impedance measurements are interpreted using dielectric constant estimates for typical filler materials. For instance, wax exhibits a dielectric constant of approximately 2, air approximates 1, and water approaches 80. Based on these values and on representative values of thickness and dielectric constant of the polymeric duct wall, that create an added and roughly constant impedance contribution, an air void occupying the space between a plate and the strand bundle may increase the measured impedance modulus by approximately 20% relative to sound wax. Conversely, water intrusion may reduce the impedance by up to 30%. These quantitative thresholds support flaw classification and may be derived from series impedance modeling of duct, filler, and flaw regions.

At step 212, defects within the tendon are identified based on the impedance comparison. For instance, results of step 210 may be used to generate a flaw map of the tendon cross-section at various angles $\alpha_v$. A defect may be defined as a region within the filler material exhibiting impedance characteristics inconsistent with the expected profile derived from the magnetic signal. Defects may include voids, water intrusion, or other material deficiencies. The identification process may result in a spatial map of flaw locations. In some embodiments, the flaw identification results may be used to generate images of the tendon cross-section, wherein regions of intact filler and flaw are rendered in distinct visual formats.

As an example, the distance vector obtained from the magnetic measurements may be used to locate individual strands within a cross-section to be imaged. For instance, a polar plot of $d_E$ versus angular orientation may be shown or stored, providing an approximation of the strand envelope shape and position. The results of the impedance comparison may then be used to color-code remaining areas (e.g., the filler and possible filler defects). For instance, imaging outputs may be rendered as color-coded cross sectional images of the tendon indicating strand positions, defect-free filler, and filler defects such as voids or anomalies (e.g., water intrusion, etc.). For example, red regions may indicate filler voids, blue regions may indicate water intrusion, and uncolored regions may represent intact filler. In further examples, the flaw identification process may be executed by a software module that performs real-time deconvolution and transformation of magnetic signal data, with processing times ranging from approximately 2 seconds to 10 seconds per scan depending on system configuration and computational resources.

The following describes example prototype devices and tendon cross-section imaging methods implementing the technology described above.

A prototype strand bundle imaging system was constructed using an electromagnetic steel strand sensor array comprising a pair of coil inductor ring arrays separated longitudinally by approximately one or two tendon diameters, as illustrated in FIG. 1B. Each coil in a ring was oriented with one end positioned adjacent to the outer surface of the tendon. The coils were identical and included ferromagnetic cores. The coil rings were positioned such that one ring was rotated relative to the other by a fixed angle θ. FIG. 1A presents an idealized longitudinal section view of the tendon and sensor configuration. Although FIGS. 1A and 1B also depict components associated with filler deficiency imaging, those components are described separately in Section 4.3. The imaging method implemented in the prototype involved conducting multiple partial measurements in rapid succession using multiplexing circuitry. In each partial measurement, one inductor from Coil Ring 1 (103) operated in excitation mode by circulating an alternating current (AC) $I_E$ through its winding. Simultaneously, another inductor from Coil Ring 2 (105) operated in sensing mode, wherein the induced AC voltage $V_S$ between the sensing coil terminals was measured. This voltage resulted from the alternating magnetic flux generated by the excitation coil. The configuration shown in FIG. 1A assumed Θ=0, with both coils aligned vertically and positioned at the same longitudinal location. A ferromagnetic coupling bar was included to join the backs of the coil pairs, enhancing magnetic flux linkage. The strands within a tendon in the field are under high longitudinal tension, resulting in a consistent cross-sectional distribution over short lengths such as that covered by the tendon imaging unit. Consequently, the coil-to-strand surface distance $d=d_1 \approx d_2$ can serve as an indicator of strand position at the angular location of the coils and on the rest of the locations covered by the unit. Due to the high magnetic permeability of the strands and optional coupler, the magnetic flux lines followed a concentrated path (e.g., FIG. 1A, 126). This configuration established strong coupling between excitation and sensing coils, analogous to electromagnetic sensors used for reinforcing bar detection. In such systems, the induced voltage $V_S$ increases as the gap d in the magnetic circuit decreases.

A mathematical relationship between $V_S$ and the envelope distance $d_E$ (which accounts for overall magnetic flux coupling) was determined empirically and via finite element modeling (FEM), as described above. In this example imaging procedure, measurements of $V_S$ with $\Theta=0$ were obtained sequentially for each coil pair around the tendon using automatic multiplexing. The excitation current remained constant resulting in a vector $V_{SV}$ of sensing. The corresponding vector of estimated envelope-to-coil distances $d_{EV}$ was determined using the functional relationship between $V_S$ and $d_E$. Angular resolution was approximately $$\frac{2\pi}{N}.$$

Figure 3A:
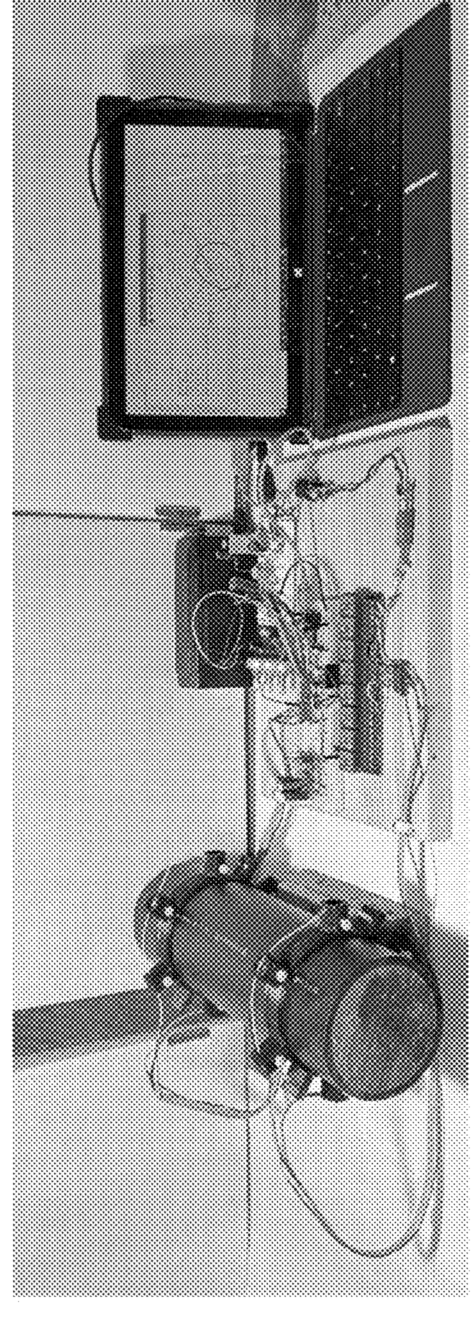
FIGS. 3A and 3B illustrate an example implementation of a coil assembly and test setup used for strand envelope imaging.
Figure 3B:
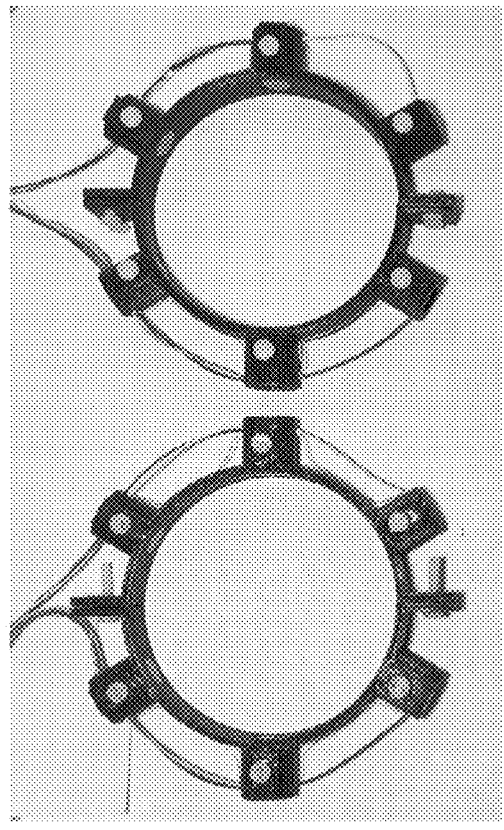

In the prototype, a value of N=6 was used, as shown in FIGS. 1A and 1B and 3B.

The prototype included coil assemblies, driving electronics, and software for strand envelope imaging. Tests demonstrated that magnetic couplers could be omitted without compromising data quality. Eliminating the coupler reduced device size and mitigated false indications caused by spurious magnetic paths when sampling coil pairs with large $d_E$ values. Without the coupler, the magnetic flux pattern became asymmetric, and a smaller fraction of flux from the excitation coil reached the sensing coil. Nonetheless, FEM simulations and experimental data confirmed that even modest excitation currents yielded sensing voltages $V_S$ above noise thresholds, enabling reliable measurements. These results also confirmed that $V_S$ varied inversely with d, supporting strand envelope reconstruction.

The prototype apparatus is shown in FIGS. 3A and 3B. The test setup included a grouted tendon segment with an 89 mm outer diameter high-density polyethylene (HDPE) duct, 5.5 mm wall thickness, approximately 300 mm length, and twelve ½ inch strands. A second mock tendon segment included ten 0.6 inch strands in a similar duct. The excitation and sensing coil arrays were identical and spaced 180 mm apart. Each array contained six 10 mHy ferrite-core coils mounted in 3D-printed holders. As shown in FIG. 3B, the holders split into halves for clamshell-style placement around the tendon, as illustrated in FIG. 3A. In further embodiments, the holders may be articulated to accommodate out-of-round or variable-size tendons and hinged within a clamshell enclosure that also houses impedance plates, resulting in a total unit length of approximately 200 mm.

The electronic control system included a 185 Hz AC signal generator, a power amplifier, and a relay bank multiplexer that sequentially energized each excitation coil. A synchronized electronic multiplexer connected each sensing coil to a signal amplifier. An Arduino Nano-style (ANS) processor received commands from a Python program running on a laptop. The ANS digital outputs controlled excitation and sensing sequences. The amplified signal was read via a 10-bit analog channel on the ANS. The Python code performed real-time Fourier transform analysis, filtering signals within a 20 Hz band around the operating frequency to eliminate noise. The resulting amplitude values for each sensing coil and excitation coil pair were organized into a 6×6 matrix:

$$Vsp_{ij}$$

The software computed average amplitude values for each sensing coil across all excitations (S-organized data) and for each excitation coil across all sensing coils (E-organized data). Given the matching coil orientations, the S and E results were observed to be similar.

A method for strand envelope recovery and graphical representation used the computed $Vs_S$ and $Vs_E$ values to generate a scaled polar plot. The plot included original values at 60° intervals and interpolated values at 30° intervals. A third-power transformation was applied, emulating prior magnetic imaging methods for grouted tendons. Each coil location was represented by a point whose radial distance from the origin was proportional to $Vs_{S,E}$. Since signal strength increased with proximity to the tendon perimeter, the resulting polar plot approximated the strand bundle envelope.

Figure 4A:
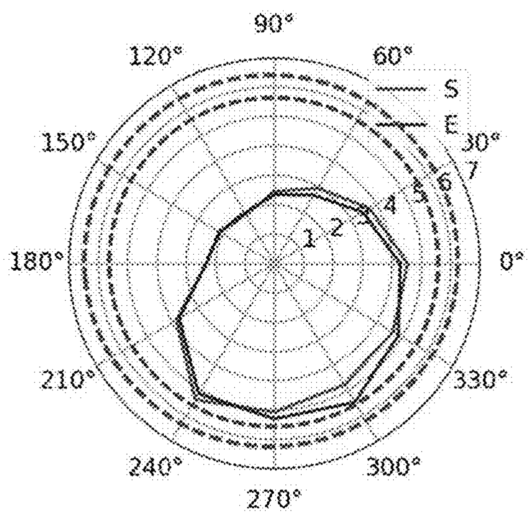
FIGS. 4A and 4B illustrate test results showing polar plots of strand envelope measurements alongside actual strand arrangements.
Figure 4A:
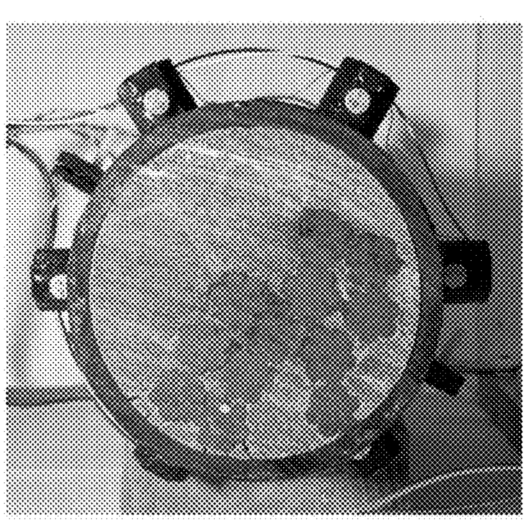
Figure 4B:
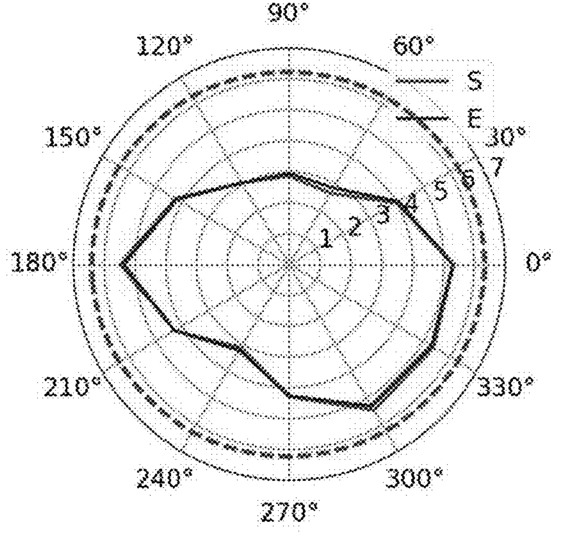
Figure 4B:
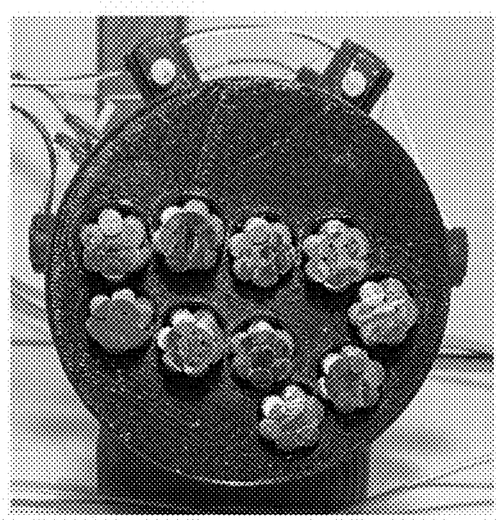

Upon initiating image acquisition, the system generated a polar plot within approximately five seconds. FIG. 4A presents the imaging results for two tendon configurations, alongside photographs of the actual strand arrangements.

Figure 5B:
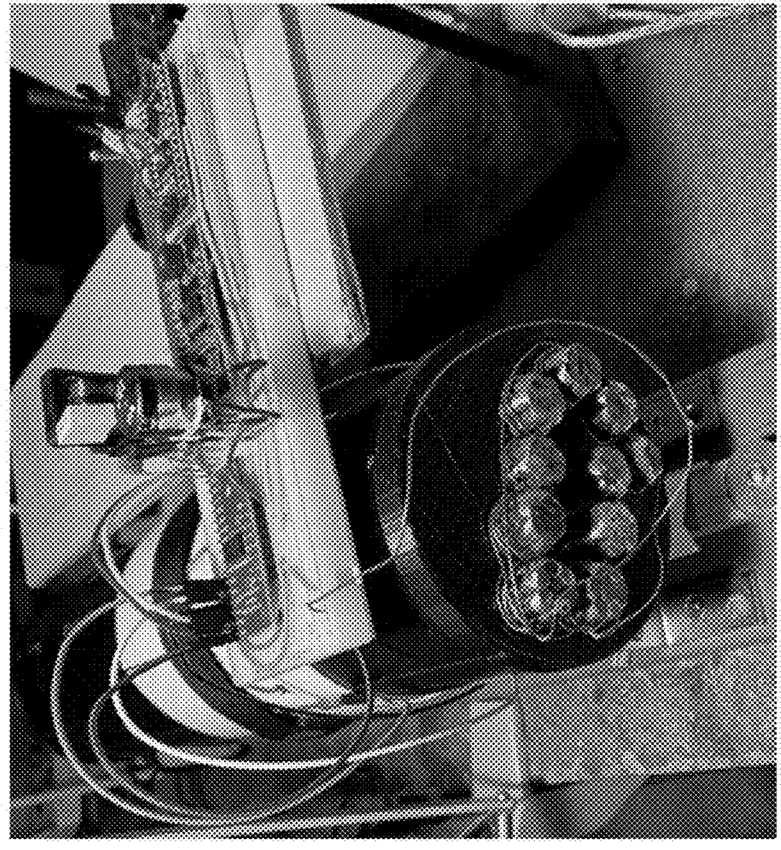
FIGS. 5A and 5B illustrate an example implementation of an impedance plate array and associated measurement electronics.
Figure 5A:
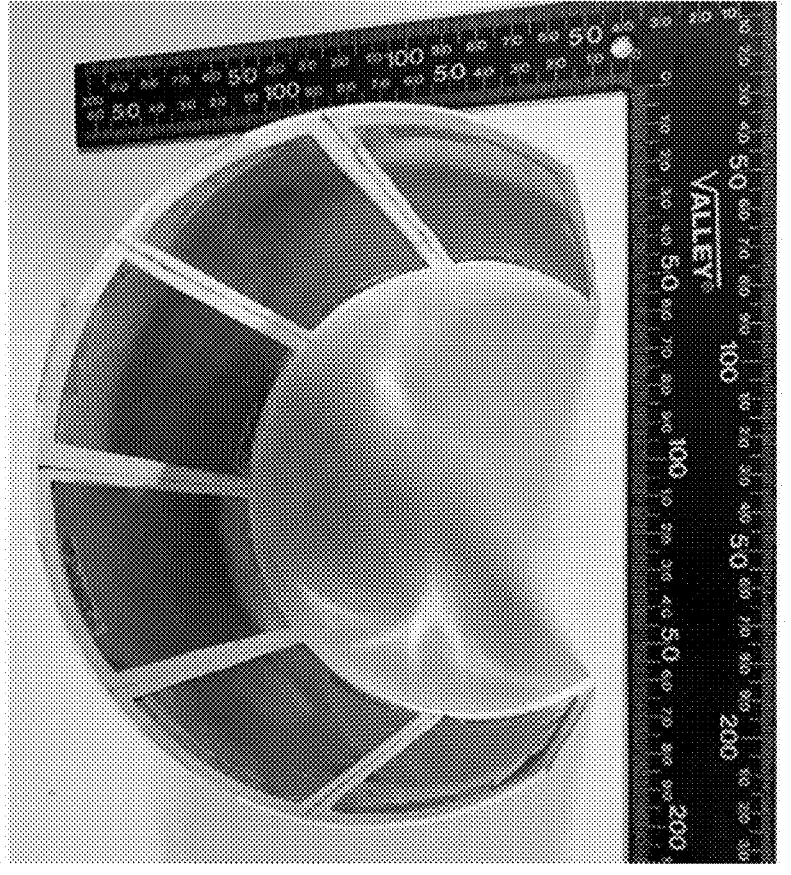

A prototype impedance measurement system was constructed to evaluate wax fill deficiencies in external tendons using angular impedance profiling. The system included a ring of impedance plates placed in close contact with the outer perimeter of the tendon duct, as shown in FIG. 5A. Each plate was connected to a multiplexing circuit that sequentially measured the electrical impedance between the plate and the steel strand bundle. The strand bundle was electrically interconnected and treated as a single conductor. The angular impedance profile was obtained without rotating the sensing unit, by electronically sampling each plate in sequence. The measurement setup is illustrated in FIG. 5B.

The sensing plates were fabricated from thin copper sheets approximately 40 mm wide and 100 mm long, bonded to a flexible plastic substrate that could be wrapped around the tendon duct and secured with a Velcro strip. Detachable thin wires connected each plate to a 74HC4067 multiplexing circuit mounted on a prototyping board. The board also included an AD9850 AC signal generator operating at approximately 1 MHz, which excited each plate sequentially. A rectifying circuit processed the signal and provided a DC value representative of the impedance modulus. The multiplexing and signal generation were controlled by an Arduino Nano-style (ANS) processor, which automatically produced a six-value impedance vector within seconds. A Python program organized the output into polar plots.

The system was tested using a mock tendon segment with known geometry. The duct was uniformly air-filled, so the impedance pattern was expected to reflect the strand envelope configuration. The measured impedance values were used to reconstruct the strand envelope by assigning a local radial distance from the recovered strand envelope to each plate, proportional to the measured impedance. Corrections were applied for duct wall thickness and dielectric constant. The results demonstrated that the reconstructed strand envelope closely matched the actual geometry, validating the concept.

Figure 6B:
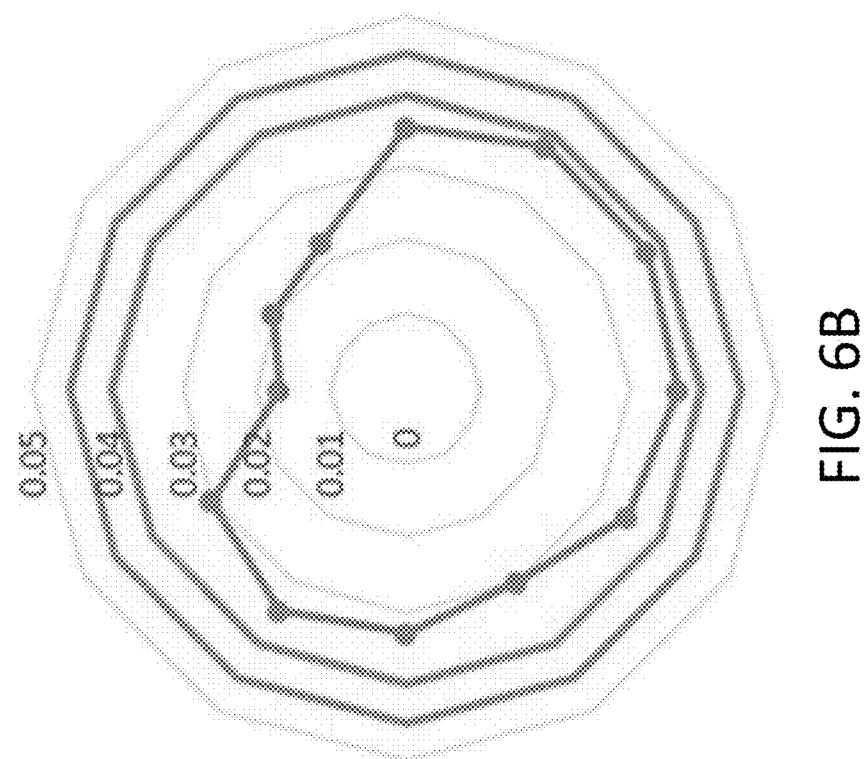
FIGS. 6A and 6B illustrate test results including a tendon mockup cross section and a polar plot derived from impedance measurements.
Figure 6A:
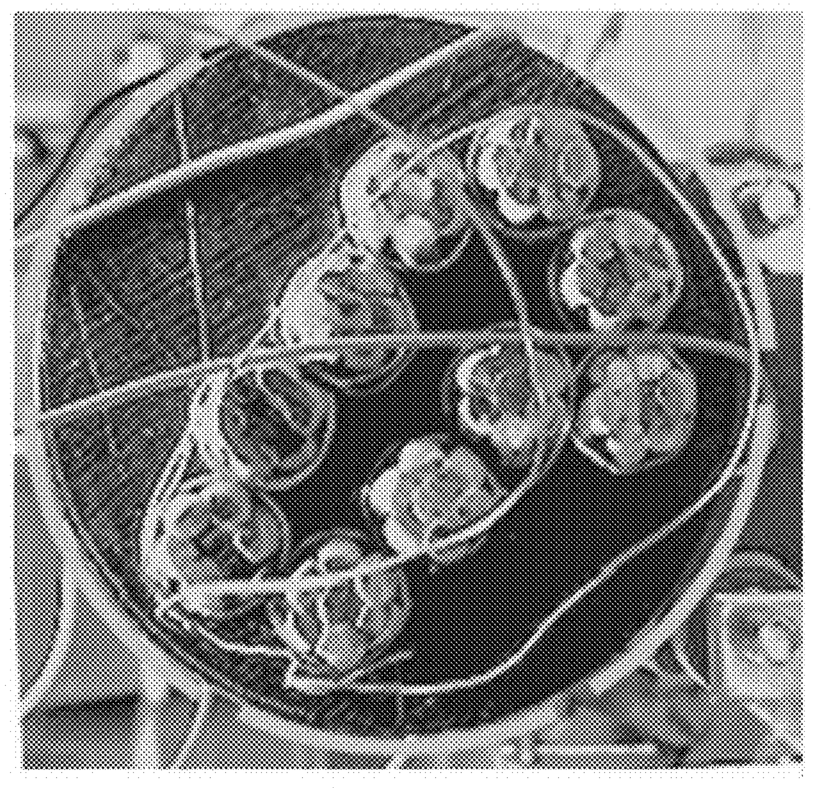

In the prototype, the impedance values at a given angular position were compared to those expected from the magnetically determined strand envelope. Higher impedance values indicated air voids, while lower values suggested water presence. This comparison enabled detection of filler deficiencies. FIG. 6A shows the cross section of the air-filled tendon mockup, and FIG. 6B presents the polar plot derived from the impedance measurements, overlaid on the geometric approximation of the duct wall and strand envelope. Red outlines are inner and outer tendon duct boundaries; radial distance between blue line and inner red line is proportional to measured impedance between strand bundle and impedance plate. Results are as expected, with greater distances obtained for locations with greater separation between plate and strand.

The impedance measurements were performed at multiple frequencies, including 100 kHz, 1 MHz, 5 MHz, and 10 MHz. For each frequency, the sensing plate was centered at angular positions in 10° increments, completing a full 360° revolution. The results showed that full void conditions exhibited the highest impedance values, while conductive water conditions exhibited the lowest. Peak and valley impedance values were observed at angular positions corresponding to the location of the defects, typically around 60°. At higher frequencies, the impedance contrast between inner and outer voids increased, enhancing sensitivity.

A magnetic data transformation method was developed and implemented to estimate the impedance profile of a wax-filled tendon in the absence of voids. The method was applied using a previously constructed Tendon Imaging Unit (TIU) originally developed for grout-filled tendons, referred to herein as the Grout TIU (see, e.g. FIG. 1C and U.S. Pat. No. 11,692,959). The Grout TIU produces measured values as a function of rotation angle α, including magnetic force F(α) and impedance modulus Z(α). As discussed above, the impedance profile that would be obtained in the absence of voids is denoted $Z_0(\alpha)$. The transformation method proceeds by estimating $Z_0(\alpha)$ from the measured F(α) profile and comparing it to the actual measured Z(α) profile. Void detection was then performed by comparing the recovered impedance profile from magnetic data to the directly measured impedance profile.

Feasibility testing was conducted to evaluate the robustness of the method. Simulations were performed using COMSOL Multiphysics for multiple random strand configurations within a tendon family of fixed properties. For each configuration, FT(K) was computed and applied to other configurations to assess the consistency of recovered $Z_0(\alpha)$ profiles. A master kernel was obtained by averaging individual kernels across configurations. Sensitivity to random errors in F(α) was evaluated by introducing perturbations and analyzing the resulting deviations in $Z_0(\alpha)$.

Prototype testing was conducted to evaluate the feasibility of using a master convolution kernel K to recover impedance profiles from magnetic data across multiple strand spatial configurations within a tendon family characterized by fixed geometric and dielectric properties. The testing procedure involved performing COMSOL Multiphysics® FEM simulations of magnetic force F(α) and impedance modulus Z(α) responses for multiple randomized strand arrangements. For each configuration, the convolution kernel K was computed using the relation FT(K)=FT(F*K)·/FT(F), as discussed above. To assess generalizability, the kernel Ky derived from one configuration x was applied to the magnetic data $F_y$ from another configuration y, yielding a recovered impedance profile $$Z^0_{xy}(\alpha) = IFT(FT(F_y)\cdot FT(K_x)),$$

where IFT denotes the inverse Fourier transform. The recovered profile $$Z^0_{xy}(\alpha)$$

was compared to the directly simulated impedance profile $$Z^0_y(\alpha)$$

for configuration y. This process was repeated across all generated strand configurations. Favorable results led to the construction of a training set average kernel by averaging the individual kernels into a master kernel applicable across the tendon family. Robustness testing was performed by introducing random errors into the magnetic force vector F(α) and evaluating the impact on the recovered impedance profile $$Z^0_{err}(\alpha).$$

The deviation between $$Z^0_{err}(\alpha)$$

and the original $Z^0(\alpha)$ was quantified to determine the sensitivity of the method to measurement noise. Multiple error levels were tested to establish acceptable thresholds for reliable impedance recovery.

Figure 7:
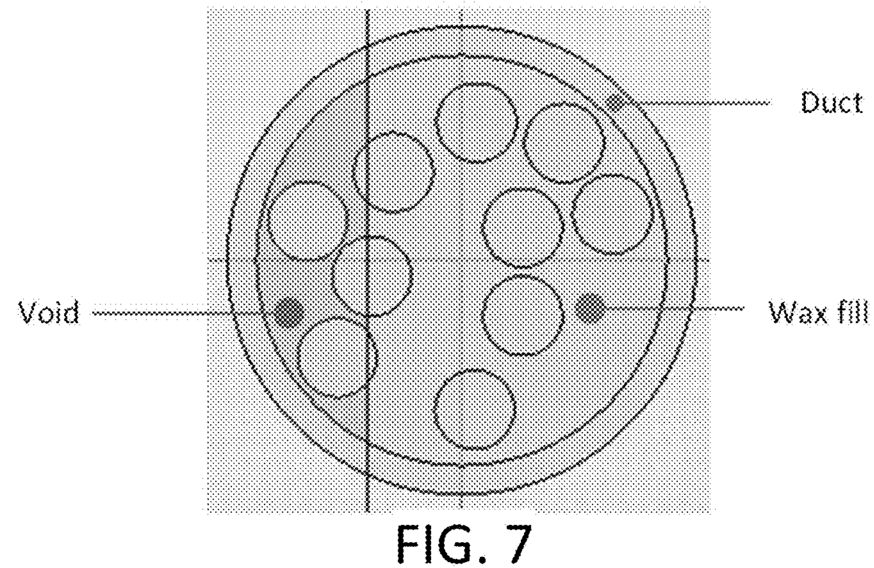
FIG. 7 illustrates a simulated wax void condition in a tendon cross section used for kernel validation testing.

Five strand pattern cases were examined, including one configuration previously used in experimental validation and four randomized arrangements with identical strand count and size. For each case, simulations were performed under two conditions: a fully wax-filled tendon and a tendon with a localized void. FIG. 7 illustrates the "Void" condition for Case 2, where wax fill is limited to a portion of the cross section, with the remainder comprising an air void. The boundary between wax and void regions was held constant across all cases.

Initial trials demonstrated that kernel swapping between cases yielded comparable impedance recovery results. Accordingly, the individual kernels were averaged to form a master training set kernel. The recovery process was refined by separately analyzing the zero-frequency and higher angular frequency components of the Fourier-transformed data, which improved the fidelity of the recovered impedance profiles. For interpretability, all impedance results were expressed in terms of equivalent circuit capacitance values. Due to symmetry reflection in the FEM simulations, reported capacitance values were multiplied by two to represent the full cross-sectional domain.

Figure 8:
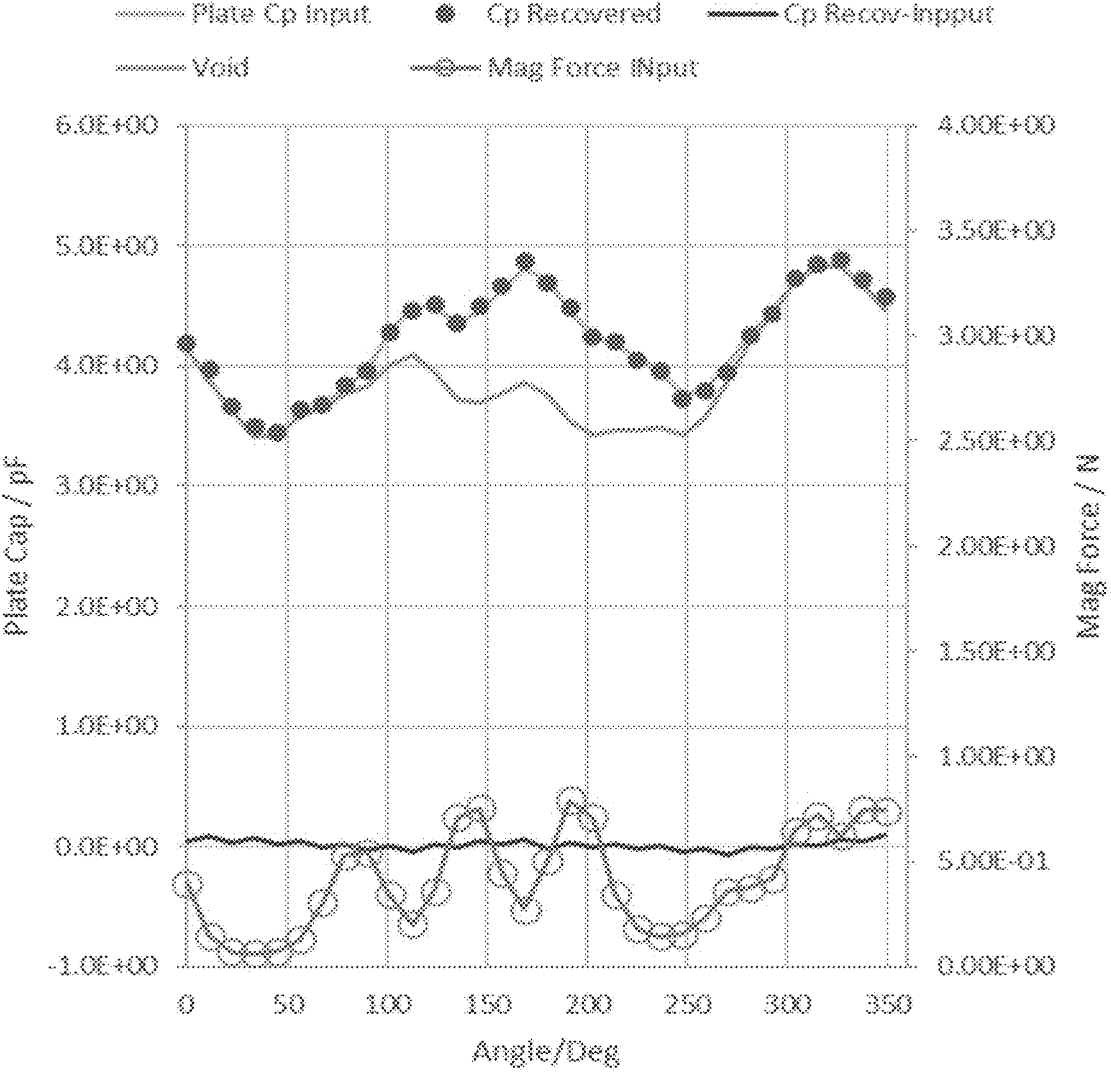
FIG. 8 illustrates test results comparing recovered and simulated impedance profiles for a wax-filled tendon with and without voids.

Representative results are shown in FIG. 8 for Case 2. The green line corresponds to the simulated magnetic force data, plotted against the right-hand ordinate axis. Blue dots represent the recovered Full Wax capacitance profile obtained using only the magnetic data and the averaged kernel components. The yellow line denotes the directly simulated Full Wax capacitance profile, while the gray line indicates the capacitance profile for the Void condition. The red line shows the error between the recovered and true Full Wax profiles. The close alignment between the recovered and directly simulated profiles, as evidenced by the small error values, supports the feasibility of the convolution-based transformation method.

Additionally, the results demonstrate reliable detection of a void of comparable or larger size than that shown in FIG. 7. In the angular region affected by the void (approximately 120° to) 260°, the gray line deviates significantly below the Full Wax profile, with differences exceeding the error margin indicated by the red line. These findings support the viability of using magnetic data to infer impedance behavior and detect wax fill deficiencies in external tendons.

Systems and software, e.g., implemented on a non-transitory computer-readable medium, for performing the methods discussed herein are also within the scope of embodiments of the present disclosure.

Embodiments of the present disclosure may thus utilize a special purpose or general-purpose computing system including computer hardware, such as, for example, one or more processors and system memory. Embodiments within the scope of the present disclosure also include physical and other computer-readable media for carrying or storing computer-executable instructions and/or data structures, including applications, tables, data, libraries, or other modules used to execute particular functions or direct selection or execution of other modules. Such computer-readable media can be any available media that can be accessed by a general purpose or special purpose computer system.

Computer-readable media that store computer-executable instructions (or software instructions) are designed to temporarily or permanently hold software instructions. Examples include memory (e.g., RAM, ROM, EPROM, EEPROM, etc.), optical disk storage (e.g., CD, DVD, HDDVD, Blu-ray, etc.), storage devices (e.g., magnetic disk storage, tape storage, diskette, etc.), flash or other solid-state storage or memory, or any other medium which can be used to store program code in the form of computer-executable instructions or data structures and which can be accessed by a general purpose or special purpose computer, whether such program code is stored as or in software, hardware, firmware, or combinations thereof.

A "network" or "communications network" may generally be defined as one or more data links that enable the transport of electronic data between computer systems and/or modules, engines, and/or other electronic devices. When information is transferred or provided over a communication network or another communications connection (either hardwired, wireless, or a combination of hardwired or wireless) to a computing device, the computing device properly views the connection as a transmission medium. Transmission media can include a communication network and/or data links, carrier waves, wireless signals, and the like, which can be used to carry desired program or template code means or instructions in the form of computer-executable instructions or data structures and which can be accessed by a general purpose or special purpose computer.

The term "execution by a computer" as used herein refers to the performance of operations, tasks, or functions by a computing device or system, including but not limited to, in various execution environments such as bare metal, virtual machines, containers, and any other computing environments. Execution by a computer includes a computer making a remote function call to another computer, where the first computer initiates and executes the function. This definition encompasses scenarios where operations are executed using one or more types of accelerators, such as digital signal processors (DSPs), neuromorphic chips, application-specific integrated circuits (ASICs), or other specialized processing units. In such instances, the processor of the computer may delegate specific tasks to these accelerators to enhance performance, efficiency, or capability.

Furthermore, the term "execution by a computer" includes the execution of software, instructions, or algorithms stored on computer-readable media. It covers any combination of hardware, firmware, and software components required to perform the desired operations. This definition should be interpreted broadly to include any system where a computer or computing device carries out the execution of tasks, whether the tasks are performed locally, remotely, or distributed across multiple computing environments and devices.

The term "computer" as used herein refers to any general-purpose or special-purpose computing device capable of processing instructions and performing operations, including, but not limited to microprocessors, microcontrollers, DSPs, neuromorphic chips, ASICs, programmable gate arrays, or any combination thereof. The computer may operate standalone or as part of a network or a larger system, and may communicate with other electronic devices and systems through various communication interfaces and protocols.

The definitions provided herein are intended to encompass the broadest possible scope of execution by a computer, reflecting the diverse and evolving nature of computing technologies and environments. All variations, modifications, and equivalents that fall within the spirit and scope of the claims are intended to be embraced by the claims.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

As used in this specification and the claims, the singular forms "a," "an," and "the" include plural forms unless the context clearly dictates otherwise. The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. Any trademarks mentioned herein are the property of their respective owners.

As used herein, the term "random" represents an outcome or value that is produced without a clear pattern or predictability. For example, the term "random" may refer to values that are generated by an algorithm or process designed to produce results that mimic true randomness, such as pseudorandom values. Further, it should be understood that any uses of the term "random" in the preceding description are intended to include both truly random and pseudorandom values. If there are uses of the term that are not clear to persons of ordinary skill in the art given the context in which it is used, "random" will mean values or outcomes that appear to be without pattern or predictability, regardless of the method of generation.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean up to plus or minus 10% of the particular term.

Further, it should be understood that any directions or reference frames in the preceding description are merely relative directions or movements. For example, any references to "up" and "down" or "above" or "below" are merely descriptive of the relative position or movement of the related elements.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not underlyingly alter the nature of the claimed subject matter. Any trademarks are the property of their respective owners.

The phrase "such as" should be interpreted as "for example, including." Moreover, the use of any and all example language, including but not limited to "such as", is intended merely to better illuminate the invention and does not pose a limitation on the scope of the invention unless otherwise claimed.

Furthermore, in those instances where a convention analogous to "at least one of A, B and C, etc." is used, in general such a construction is intended in the sense of one having ordinary skill in the art would understand the convention (e.g., "a system having at least one of A, B and C" would include but not be limited to systems that have A alone, B alone, C alone, A and B together, A and C together, B and C together, and/or A, B, and C together). It will be further understood by those within the art that virtually any disjunctive word and/or phrase presenting two or more alternative terms, whether in the description or figures, should be understood to contemplate the possibilities of including one of the terms, either of the terms, or both terms. For example, the phrase "A or B" will be understood to include the possibilities of "A" or "B" or "A and B."

All language such as "up to," "at least," "greater than," "less than," and the like, include the number recited and refer to ranges which can subsequently be broken down into ranges and subranges. A range includes each individual member. Thus, for example, a group having 1-3 members refers to groups having 1, 2, or 3 members. Similarly, a group having 6 members refers to groups having 1, 2, 3, 4, or 6 members, and so forth. Unless otherwise indicated to the contrary, any example ranges are illustrative only and the technology may be practiced without meeting the range. For instance, the description of a coil between 0.5 inches and 1.5 inches does not imply that all implementations of the described technology are limited to such coil sizes, but rather provide illustrative examples of coil sizes to ease understanding of the technology.

The modal verb "may" refers to the preferred use or selection of one or more options or choices among the several described embodiments or features contained within the same. Where no options or choices are disclosed regarding a particular embodiment or feature contained in the same, the modal verb "may" refers to an affirmative act regarding how to make or use an aspect of a described embodiment or feature contained in the same, or a definitive decision to use a specific skill regarding a described embodiment or feature contained in the same. In this latter context, the modal verb "may" has the same meaning and connotation as the auxiliary verb "can."

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:

applying a magnetic field to an internal region of a tendon using a plurality of excitation coils disposed around a first circumference of the tendon proximal to the internal region;

acquiring a set of magnetic measurements at a surface proximal to the internal region using a plurality of sensing coils disposed around a second circumference of the tendon proximal to the internal region;

acquiring a set of electrical impedance measurements at the surface using a plurality of impedance plates disposed between the first circumference and the second circumference;

calculating a set of expected filler defect-free impedance values for the surface from the set of magnetic measurements using a convolutional kernel function;

comparing the expected filler defect-free impedance values to the set of electrical impedance measurements; and identifying a filler defect within the tendon based on the comparison.

2. The method of claim 1, further comprising:

selecting the convolutional kernel function based at least in part on at least one of: a size, a number of strands, a design dimension, or on a material of the tendon.

3. The method of claim 2, wherein the convolutional kernel function is selected from a library of precomputed convolutional kernel functions corresponding to selected tendon configurations.

4. The method of claim 1, wherein the plurality of excitations coils are fixed to a first clamshell collar, the plurality of sensing coils are fixed to a second clamshell collar, and the plurality of impedance plates are fixed to a third clamshell collar.

5. The method of claim 1, wherein calculating the expected impedance value comprises:

performing a Fourier transform on the set of magnetic measurements;

performing a Fourier transform on the convolutional kernel function;

multiplying the transformed set of magnetic measurements by the transformed convolutional kernel function; and performing an inverse Fourier transform on the result of the multiplication.

6. The method of claim 1, wherein identifying the filler defect within the tendon based on the comparison comprises generating a near real-time image of a cross-section of the tendon, wherein a type of the filler defect and a position of the filler defect are shown together with the strand bundle.

7. A system comprising:

a magnetic field generator configured to apply a magnetic field to a strand bundle within an internal region of a tendon, the magnetic field generator comprising a plurality of excitation coils disposed around a first circumference of the tendon proximal to the internal region;

a magnetic response detector configured to acquire a set of magnetic measurements at a surface proximal to the internal region, the magnetic response detector comprising a plurality of sensing coils disposed around a second circumference of the tendon proximal to the internal region;

an impedance measurement unit configured to acquire a set of electrical impedance measurements at the surface, the impedance measurement unit comprising a plurality of impedance plates disposed between the first circumference and the second circumference;

a processor operatively connected to the magnetic response detector and the impedance measurement unit; and a non-transitory computer-readable medium storing instructions that, when executed by the processor, cause the processor to:

calculate a set of expected filler defect-free impedance values for the surface from the set of magnetic measurements using a convolutional kernel function;

compare the expected filler defect-free impedance values to the set of electrical impedance measurements; and identify a filler defect within the tendon based on the comparison.

8. The system of claim 7, wherein the processor is configured to select the convolutional kernel function based at least in part on at least one of: a size, a number of strands, a design dimension, or a material of the tendon.

9. The system of claim 8, further comprising a library of precomputed convolutional kernel functions corresponding to selected tendon configurations, and wherein the processor is configured to select the convolutional kernel function from the library.

10. The system of claim 7, wherein the processor is configured to:

perform a Fourier transform on the set of magnetic measurements;

perform a Fourier transform on the convolutional kernel function;

multiply the transformed set of magnetic measurements by the transformed convolutional kernel function; and perform an inverse Fourier transform on the result of the multiplication.

11. The system of claim 7, wherein the processor is further configured to generate a near real-time image of a cross-section of the tendon based on the comparison, wherein a type of the filler defect and a position of the filler defect are shown together with the strand bundle.

* * * * *